United States Patent
Ohtake et al.

(10) Patent No.: US 7,612,949 B2
(45) Date of Patent: Nov. 3, 2009

(54) ZOOM LENS AND IMAGING APPARATUS

(75) Inventors: Motoyuki Ohtake, Saitama (JP); Atsushi Suzuki, Chiba (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/979,673

(22) Filed: Nov. 7, 2007

(65) Prior Publication Data
US 2008/0158688 A1 Jul. 3, 2008

(30) Foreign Application Priority Data
Dec. 27, 2006 (JP) .............................. 2006-351560

(51) Int. Cl.
*G02B 15/14* (2006.01)
(52) U.S. Cl. ...................... 359/689; 359/680
(58) Field of Classification Search ......... 359/680–682, 359/686, 689
See application file for complete search history.

(56) References Cited

U.S. PATENT DOCUMENTS

| 6,925,253 | B2 * | 8/2005 | Miyatake | 396/79 |
| 7,023,623 | B2 * | 4/2006 | Miyatake et al. | 359/676 |
| 2005/0275951 | A1 * | 12/2005 | Otake | 359/689 |
| 2008/0084616 | A1 * | 4/2008 | Katakura | 359/689 |

FOREIGN PATENT DOCUMENTS

| JP | 01-116619 | 5/1989 |
| JP | 06-337374 | 12/1994 |
| JP | 11-174329 | 7/1999 |
| JP | 2002-277740 | 9/2002 |
| JP | 2004-061675 | 2/2004 |
| JP | 2006-078581 | 3/2006 |
| JP | 2006-227516 | 8/2006 |
| WO | WO 02/082158 | 10/2002 |
| WO | WO-03/085440 A1 | 10/2003 |
| WO | WO 2006/001431 A1 | 1/2006 |

* cited by examiner

*Primary Examiner*—Darryl J Collins
(74) *Attorney, Agent, or Firm*—Rader, Fishman & Grauer PLLC

(57) ABSTRACT

A zoom lens includes, in order from the object side, a first lens group having a negative refractive power, a second lens group having a positive refractive power, and a third lens group having a positive refractive power. When a lens positional state changes from a maximum wide angle state to a maximum telephoto state, the second lens group moves on an optical axis toward an object, and the first and the third lens groups also move in an optical axis direction such that a gap between the first lens group and the second lens group decreases, while gap between the second lens group and the third lens group is increased. When a change in subject position occurs, close-range focusing is performed by movement of the third lens group, and image shift is provided by shifting the second lens group in directions approximately perpendicular to the optical axis.

9 Claims, 24 Drawing Sheets

TRANSVERSE ABERRATION

TRANSVERSE ABERRATION

TRANSVERSE ABERRATION

TRANSVERSE ABERRATION

TRANSVERSE ABERRATION

TRANSVERSE ABERRATION

TRANSVERSE ABERRATION

TRANSVERSE ABERRATION

TRANSVERSE ABERRATION

ZOOM LENS AND IMAGING APPARATUS

BACKGROUND OF THE INVENTION

1. Field of the Invention

The present invention relates to a novel zoom lens and an imaging apparatus. More specifically, the present invention relates to an image-shiftable zoom lens which may shift image by shifting a part of lenses in directions approximately perpendicular to an optical axis, as well as to an imaging apparatus equipped with the zoom lens.

2. Description of Related Arts

As a recording mean of a camera, there has been known a method in which recording of a subject image formed on an imaging device plane is performed after conversion of a light intensity of the subject image into electric output with each photoelectric converting element by an imaging device using of photoelectric converting elements, such as Charge Coupled Devices (CCDS) and Complementary Metal-Oxide Semiconductors (CMOSs).

In recent years, as the number of photoelectric converting element pixels increases, an angle of view with respect to one pixel size becomes narrow, and an image blur is caused by a camera shake and others when shutter release is made. Consequently, there tends to be a marked problem that an image is recorded at an unclear state.

Further, a highly integrated circuit substrate included in a camera allows a camera body to be smaller in size and lighter, and as more cameras are provided with a large-sized liquid crystal display, a camera body is kept apart from a user's body in order to view a liquid crystal display during the image taking. Due to the above and other reasons, users have, more frequently than ever, a higher chance to take images in a condition where the camera body is susceptible to shakes. Thus, the image blur caused by the camera shake becomes a serious issue.

Optical camera-shake correcting systems are known as a camera-shake correcting system for correcting the image blur caused by the camera shake and others.

As one optical camera-shake correcting system, there is a lens shift scheme in which a part of the lens system is shifted in directions perpendicular to an optical axis. Optical systems disclosed in Japanese Patent Application Publication No. JP Hei 1-116619 (Patent Document 1), Japanese Patent Application Publication No. JP Hei 6-337374 (Patent Document 2), Japanese Patent Application Publication No. JP Hei 11-174329 (Patent Documents 3), and the like are known as an optical system employing the lens shift scheme of this type, for instance.

A zoom lens presented in Patent Document 1 includes three lens groups, in order from the object side, a first lens group having a negative refractive power, a second lens group having a positive refractive power and a third lens group having a negative refractive power, in which image shift is provided by shifting the second lens group in directions approximately perpendicular to an optical axis.

A zoom lens presented in Patent Document 2 includes two lens groups in order from the object side, a first lens group having a negative refractive power and a second lens group having a positive refractive power, in which image shift is provided by shifting the second lens group in directions approximately perpendicular to an optical axis.

A zoom lens presented in Patent Document 3 includes four lens groups in order from the object side, a first lens group having a negative refractive power, a second lens group having a positive refractive power, a third lens group having a negative refractive power and a fourth lens group having a positive refractive power, in which image shift is provided by shifting the third lens group in directions approximately perpendicular to an optical axis.

SUMMARY OF THE INVENTION

However, a zoom lens including three negative, positive and positive lens groups has a lens mount which is of a retractable mount-type structure. Thus, particularly, if the second lens group is configured as a shift lens group, the zoom lens of this type gives rise to an issue that an increase in shift drive amount, in other words, a decrease in blur correction coefficient enlarges a size of a shift drive mechanism, resulting in an increase in lens mount diameter, or in lens mount thickness for retractable mounting.

Further, the zoom lens presented in Patent Document 1 includes the negative lens group located at the side closest to the image, and whose exit pupil position is close to an image plane. Thus, the zoom lens of this type has an issue that a lack of light intensity in a periphery of a display becomes more apparent because of vignett arising from a micro-lens array, which is adapted to increase a light intensity at a light-receiving unit of an imaging device.

The zoom lens presented in Patent Document 2 has a considerable number of lenses included in the second lens group, and thus a drive mechanism becomes complicated, resulting in a failure to attain downsizing of the zoom lens.

The zoom lens presented in Patent Document 3 has a greater total lens length in the maximum wide-angle state as compared with that in the maximum telephoto state, therefore an off-axial luminous flux passing through the first lens group becomes distant from the optical axis, resulting in a failure to attain sufficient downsizing.

Accordingly, it is desirable to provide a zoom lens capable of shifting an image and suited for reductions in diameter and thickness of a lens system, as well as an imaging apparatus equipped with the zoom lens. The present invention has been undertaken in view of the issues.

A zoom lens according to one embodiment of the present invention includes, in order from an object side, a first lens group having a negative refractive power, a second lens group having a positive refractive power and a third lens group having a positive refractive power. When a lens positional state changes from a maximum wide angle state to a maximum telephoto state, the second lens group moves in an optical axis toward an object, and the first and the third lens groups also move in an optical axis direction such that a gap between the first lens group and the second lens group decreases, while a gap between the second lens group and the third lens group is increased. When a subject position is changed, close-range focusing is performed by movement of the third lens group, and image may be shifted by shifting the second lens group in directions substantially perpendicular to the optical axis. Further, conditional equations (1) and (2) shown below are satisfied.

$$0.8 < TLw/TLt < 0.95 \quad (1)$$

$$0.6 < |f1|/ft < 0.8 \quad (2)$$

where $TLw$ is a total lens length in a maximum wide angle state, $TLt$ is a total lens length in a maximum telephoto state, $f1$ is a focal length of the first lens group, and $fw$ is a focal length of an overall lens system in the maximum telephoto state.

An imaging apparatus according to one embodiment of the present invention includes a zoom lens and an imaging device for converting an optical image formed by the zoom lens into electric signals. The zoom lens includes, in order from the object side, a first lens group having a negative refractive power, a second lens group having a positive refractive power and a third lens group having a positive refractive power. When a lens positional state changes from a maximum wide angle state to a maximum telephoto state, the second lens group moves on an optical axis toward an object side, and the first and the third lens groups also move in an optical axis direction such that a gap between the first lens group and the second lens group decreases, while increasing a gap between the second lens group and the third lens group. When subject position is changed, close-range focusing is performed by movement of the third lens group, and image shift is performed by shifting the second lens group in directions approximately perpendicular to the optical axis. Further, conditional equations (1) and (2) shown below are satisfied.

$$0.8 < TLw/TLt < 0.95 \qquad (1)$$

$$0.6 < |fl|/ft < 0.8 \qquad (2)$$

where TLw is a total lens length in a maximum wide angle state, TLt is a total lens length in a maximum telephoto state, fl is a focal length of the first lens group, and ft is a focal length of an overall lens system in the maximum telephoto state.

BRIEF DESCRIPTION OF THE DRAWINGS

FIG. 4 shows spherical aberration, astigmatism, distortion and transverse aberration at a mid-focal length position. FIG. 5 shows spherical aberration, astigmatism, distortion and transverse aberration in a maximum telephoto state;

FIG. 7 show transverse aberration in a mid-focal length position. FIG. 8 show transverse aberration in a maximum telephoto state;

FIG. 11 shows spherical aberration, astigmatism, distortion and transverse aberration at a mid-focal length position. FIG. 12 shows spherical aberration, astigmatism, distortion and transverse aberration at a maximum telephoto state;

FIG. 14 show transverse aberration at a mid-focal length position. FIG. 15 show transverse aberration at a maximum telephoto state;

FIG. 18 shows spherical aberration, astigmatism, distortion and transverse aberration at a mid-focal length position. FIG. 19 shows spherical aberration, astigmatism, distortion and transverse aberration at a maximum telephoto state;

FIG. 21 shows transverse aberration at a mid-focal length position. FIG. 22 shows transverse aberration at a maximum telephoto state;

DETAILED DESCRIPTION OF THE EMBODIMENTS

Figure 1:
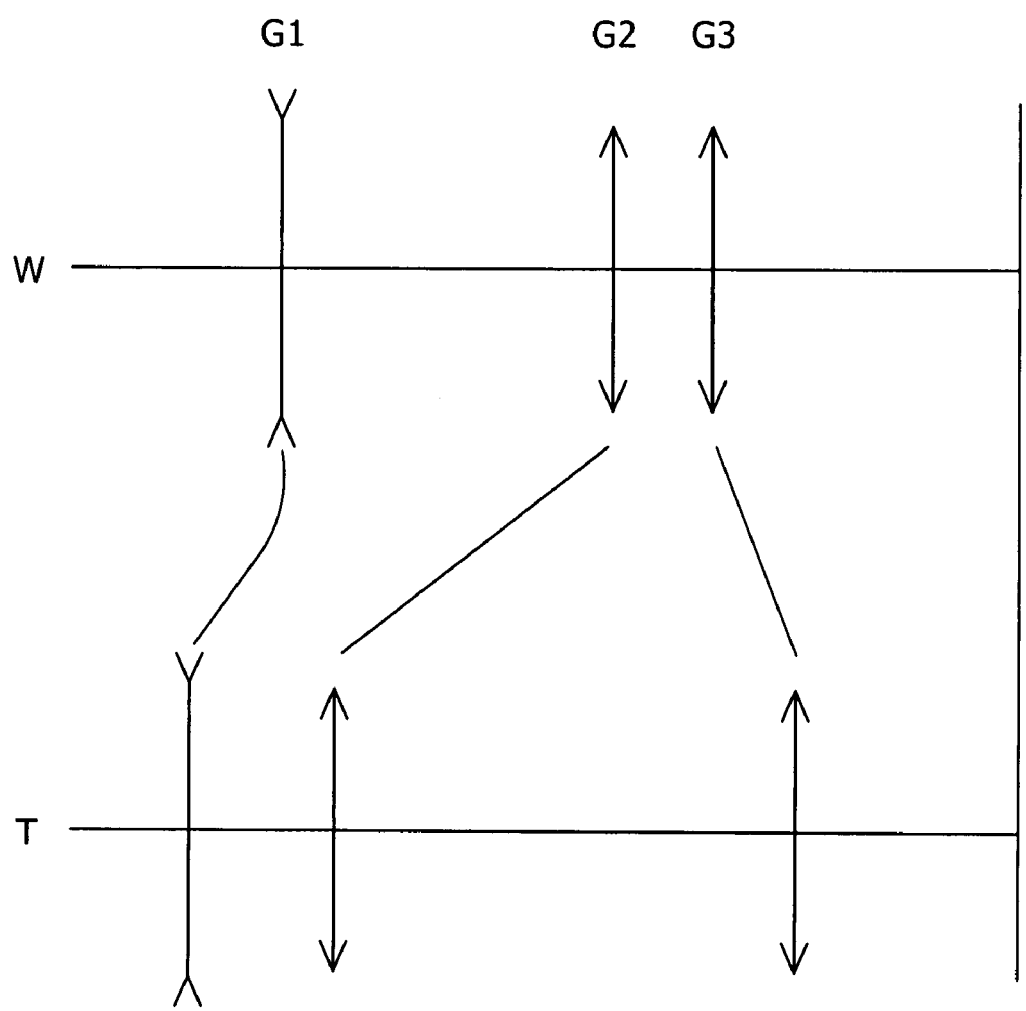
FIG. 1 shows a refractive power allocation with respect to an embodiment of a zoom lens according to the present invention.

Hereinafter, embodiments of a zoom lens and an imaging apparatus according to the present invention are described with reference to accompanying drawings.

To begin with, the zoom lens of the present invention is described.

The zoom lens of the present embodiment includes, in order from an object side, a first lens group having a negative refractive power, a second lens group having a positive refractive power and a third lens group having a positive refractive power. When a lens positional state changes from a maximum wide angle state to a maximum telephoto state, the second lens group moves in an optical axis toward an object, and the first and the third lens groups move in an optical axis direction such that a gap between the first lens group and the second lens group decreases, while a gap between the second lens group and the third lens group is increased. When a subject position is changed, close-range focusing is performed by movement of the third lens group, and an image may be shifted by shifting the second lens group in directions substantially perpendicular to the optical axis. Further, conditional equations (1) and (2) shown below are satisfied.

$$0.8 < TLw/TLt < 0.95 \qquad (1)$$

$$0.6 < |fl|/ft < 0.8 \qquad (2)$$

where TLw is a total lens length in a maximum wide angle state, TLt is a total lens length in a maximum telephoto state, fl is a focal length of the first lens group, and ft is a focal length of an overall lens system in the maximum telephoto state.

This allows the image shift, and also the reductions in diameter and thickness of the lens system.

A decrease of the gap between the first lens group and the second lens group at the time lens positional state is changed from the maximum wide angle state to the maximum telephoto state causes transverse magnification of the second lens group to change, and focal length of the overall lens system to change. The third lens group provides, by moving in the optical axis direction, satisfactory correction of image-plain curvature fluctuations caused in association with the change in lens positional state.

Moving the third lens group at the time of close-range focusing allows simplification of a lens mount structure. This is because lenses included in the third lens group are small in diameter.

The zoom lens according to an embodiment of the present invention allows a reduction in total lens length, as well as in outer lens diameter by giving appropriate definition to an amount of shift of the second lens group at the time of zooming and also to the transverse magnification of the second lens group. Specifically, the conditional equation (1) is an equation to define the amount of change in total lens length at both the maximum wide angle state and the maximum telephoto state, in other words, to define the transverse magnification of the second lens group and the amount of shift of the second lens group at the time of zooming.

When an upper limit of the conditional equation (1) is exceeded, the gap between the first lens group and the second lens group is widened at the maximum wide angle state, and thus it becomes difficult to appropriately correct negative distortion caused at the maximum wide angle state. The second lens group is also applicable to correction, in which case, however, an off-axial luminous flux becomes distant from the optical axis and wider lens diameter is required for the lenses of the second lens group, thereby causing an undesirable increase in shift drive mechanism.

Conversely, when a value is lower than a lower limit of the conditional equation (1), the shift amount of the second lens group required increases when a lens positional state is changed, which leads to a failure to attain a sufficient reduction in total lens mount thickness.

The zoom lens including three negative, positive and positive lens groups has been frequently used in so-called retractable mount-type cameras adapted to accommodate the lens groups in a camera body with inter-lens group gaps minimized.

There has been a need for the zoom lens used in the retractable mount-type cameras to attain a reduction in total lens length, simultaneously with a reduction in lens thickness, in order to attain a reduction in thickness of the camera body. This is because a lens mount for holding and shifting the lenses in the optical axis direction is formed of a plurality of barrels such that they are housed in the camera body, with each lens mount overlapped at the time of retractable mounting.

To reduce camera body thickness, the first lens group moves to the object side after being once moved to the image side when a lens positional state is changed from the maximum wide angle state to the maximum telephoto state, such that the total lens length of the maximum wide angle state becomes approximately a same condition as that in the maximum telephoto state.

The first lens group moves toward the image side in the range where the transverse magnification of the second lens group is −1 to 0, and moves to object side when the transverse magnification becomes smaller than −1. Accordingly, the zoom lens including the three negative, positive and positive lens groups contains a position where the transverse magnification of the second lens group is −1 in the course of the change in lens positional condition from the wide-angle end to the maximum telephoto state.

Figure 23:
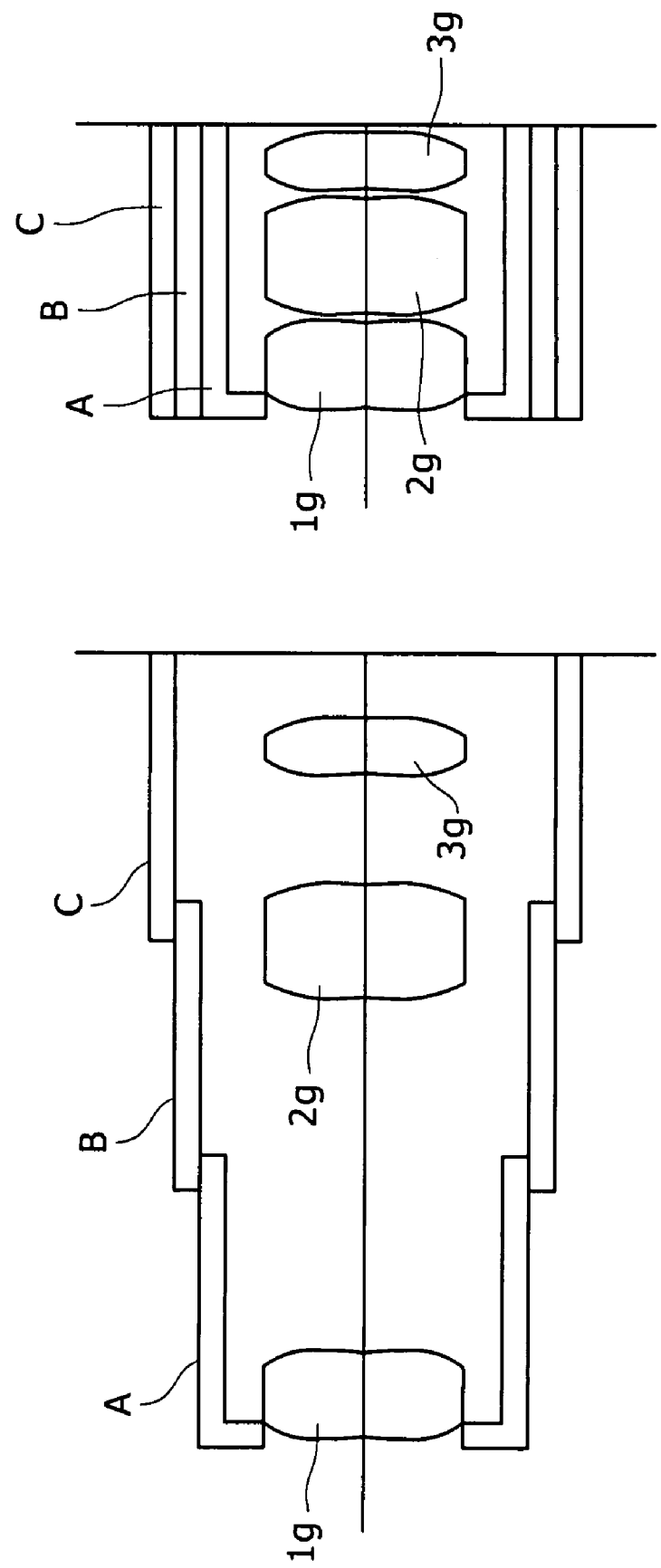
FIG. 23 is a schematic sectional view showing a lens mount structure with respect to a retractable mount-type camera.

As one retractable mount structure, there is known a two-stage retractable mount type which has an overlapped three lens mounts A (for supporting a first lens group 1g), B (for supporting a second lens group 2g) and C (for supporting a third lens group 3g), and two lens mounts A and B are driven in the optical axis direction, as shown in FIG. 23, for instance. It is noted that the right and left sides in FIG. 23 respectively show the lens mount in a housed state and that in use.

The lens mount B is rotationally driven for movement in the optical axis direction along a cam groove provided between the lens mounts B and C. The lens mount B is let out in the optical axis direction from a retractable mounted position to the maximum wide angle state, while being fixed in the optical axis direction during the change from the maximum wide angle state to the maximum telephoto state. The lens mount A is movable in the optical axis direction along the cam groove provided within the lens mount B. The lens mount A is let out with respect to the lens mount B from the retractable mounted position to the maximum wide angle state, followed by being driven in the optical axis direction along a predetermined cam track from the maximum wide angle state to the maximum telephoto state. The second lens group 2g is driven in the optical axis direction along the cam groove provided on the inner wall of the lens mount B.

When the shift amount of the second lens group 2g required for the change of lens positional state from the maximum wide angle state to the maximum telephoto state is increased, length of the cam groove, which is to be provided on the inner wall of the lens mount B, in the optical axis direction becomes long, and consequently the lens mount B becomes thick in the optical axis direction. From this reason, for downsizing, it is important that the shift amount of the second lens group 2g should be held down as much as possible.

The lens shift scheme included in the optical camera-shake correcting system is to correct an image blur by shifting the shift lens group in the directions perpendicular to the optical axis by a shift amount corresponding to an amount of image blur caused by the camera shake and others. Now, an image blur amount $\delta b$ is expressed as shown below, based on assumption that f is a focal length of the overall optical system, and $\theta$ is a camera shake angle (or inclination).

$$\delta b = f \tan \theta$$

Then, an image shift amount $\delta s$ with respect to a shift amount $\Delta$ of the shift lens group is expressed as shown below.

$$\delta s = \beta \Delta$$

where $\beta$ is called a blur correction coefficient.

Accordingly, a condition in which blur correction is performed is expressed by an equation below:

$$\delta b + \delta s = 0$$

In the present embodiment, the second lens group is assumed as the shift lens group, and the image is shifted by shifting the second lens group in the directions approximately perpendicular to the optical axis.

The blur correction coefficient $\beta$ when shifting the second lens group is given by an equation (A) shown below.

$$\beta = (1-\beta_2) \cdot \beta_3 \tag{A}$$

where $\beta_2$ is the transverse magnification of the second lens group, and $\beta_3$ is the transverse magnification of the third lens group.

As described above, the zoom lens of the present embodiment ensures that with respect to the transverse magnification of the second lens group, −1 transverse magnification is included in the range from the maximum wide angle state to the maximum telephoto state, and that the reduction in total lens length is achieved in such a manner by performing a reduction in size of an image formed by the second lens group by the third lens group. To be short, β2 is supposed to take a value close to −1, while β3 falls in the range from 0 to 1.

From the above, a blur correction coefficient becomes high when the second lens group is assumed as the shift lens group, permitting the image blur correction to be achieved by a smaller shift amount, resulting in attainment of downsizing of a drive system for driving the second lens group included as the shift lens group.

When the zoom lens including the three negative, positive and positive lens groups is so configured as to shift the image by shifting the second lens group in the directions approximately perpendicular to the optical axis, if the transverse magnification β3 of the third lens group is brought closer to 1, the blur correction coefficient becomes higher in the equation (A), but the positive refractive power of the third lens group becomes weak. As a result, the required amount of shift of the third lens group for the close-range focusing increases, causing a drive mechanism of the third lens group to be complicated.

Conversely, when the transverse magnification β3 of the third lens group is brought closer to 0, the blur correction coefficient becomes lower, and the shift amount δs required for correcting a predetermined camera-shake angle increases, causing a shift drive mechanism of the shift lens group (or the second lens group) to be complicated.

The zoom lens of the present embodiment achieves correction of the predetermined camera-shake angle with the smaller amount of lens shift by increasing negatively the transverse magnification β2 of the second lens group and by enhancing the blur correction coefficient.

When a higher blur correction coefficient is established, the blur correction may be achieved by the smaller amount of lens shift. Then, the smaller the amount of lens shift is, the smaller the change in height of rays passing through the shift lens group (or the second lens group) is, such that higher performance is also easily attainable.

The conditional equation (2) is to define the focal length of the first lens group.

When an upper limit of the conditional equation (2) is exceeded, an off-axial luminous flux passing through the first lens group becomes distant from the optical axis, resulting in a difficulty in attaining the reduction in size of the first lens group. Conversely, when a value is lower than a lower limit of the conditional equation (2), it is difficult to attain the reduction in total lens length. In addition, the off-axial luminous flux entering the second lens group goes into a less diverged state to enlarge size of lens diameter of the second lens group and to cause the drive mechanism for shifting the second lens group in the directions perpendicular to the optical axis to be complicated.

The zoom lens according to one embodiment of the present invention ensures that it is possible to suppress the fluctuations in various aberrations caused in association with shift of the second lens group, and also to attain the downsizing by arranging a position of an aperture stop, as well as a lens configuration of the second lens group. Specifically, it is desirable that an aperture stop is located adjacent to the object side of the second lens group, that the second lens group is formed of a positive lens L21 and a cemented negative lens L22 placed on the image side of the positive lens L21 and made up of a convexo-convex positive lens and a concavo-concave negative lens, and that a conditional equation (3) shown below is satisfied.

$$0.5 < RN2/Ds < 0.85 \quad (3)$$

where RN2 is a radius of curvature of an image-side lens surface of the cemented negative lens L22, and Ds is a distance from the aperture stop to the image-side lens surface of the cemented negative lens L22.

First, it is desirable that the aperture stop is located at the object side of the second lens group. In recording a subject image with the imaging device, a luminous flux for a projecting optical system is exited in a state approximately parallel to the optical axis. With respect to the zoom lens according to one embodiment of the present invention, a main ray passing through the center of the aperture stop also exits the third lens group in a state approximately parallel to the optical axis. All things considered, the aperture stop is placed in the vicinity of a composite object-side focal plane obtained by the second lens group and the third lens group.

The second lens group has a greater refractive power. Thus, if the off-axial luminous flux passes while keeping a distance from the optical axis, changes in off-axial aberration occurring in association with lens shift are increased. It is important that an angle formed by the main ray passing through the apertures top position with the optical axis be made small in order to bring the off-axial luminous flux closer to the optical axis. For that purpose, it is necessary to keep the aperture stop distant from the image plane, and therefore, the aperture stop is arranged at the object side of the second lens group. In addition, since the off-axial luminous flux entering the first lens group in the maximum wide angle state gets closer to the optical axis, it is adaptable to the reduction in size of lens diameter that is satisfied as well.

The configuration of the second lens group is now described.

As described, it is essential that the angle formed by the main ray passing the aperture stop position and the optical axis be made small in order to suppress the fluctuations in the off-axial aberration caused in association with the lens shift. However, there are, on the image side of the aperture stop, only the second and the third lens groups both having the positive refractive power, resulting in a difficulty in making smaller the angle formed as described the above.

Accordingly, the zoom lens according to one embodiment of the present invention attempts to make smaller the angle formed by the main ray passing the aperture stop position and the optical axis in such a manner that the refractive power allocation of the second lens group is taken to be of positive-negative structure by configuring the second lens group with the positive lens L21 and the cemented negative lens L22 placed on the image side of the positive lens L21 and made up of the convexo-convex positive lens and the concavo-concave negative lens. In addition, application of the positive-negative structure makes it possible to achieve correction of negative distortion aberration occurring in the maximum wide angle state.

The conditional equation (3) is applicable to define the radius of curvature of the image-side lens surface of the cemented negative lens arranged in the second lens group.

When an upper limit of the conditional inequality (3) is exceeded, it becomes difficult to achieve the satisfactory correction of the negative distortion occurring in the maximum wide angle state.

Conversely, when a value is lower than a lower limit of the conditional equation (3), each refractive power of the positive lens L21 and the cemented negative lens L22 both included in the second lens group increases, and remarkable degradation of the optical performance is caused by relative inclinations occurring in the manufacturing process, resulting in a difficulty in maintaining a stable optical quality.

In the zoom lens according to one embodiment of the present invention, it is desirable that at least one of the object-side lens surface or the image-side lens surface of the positive lens L21 is of an aspherical shape, and that a conditional equation (4) shown below is satisfied.

$$1 < fw/faw < 1.5 \tag{4}$$

where faw is a composite focal length of the first lens group and the positive lens L21 in the second lens group, and fw is a focal length of the overall lens system in the maximum wide angle state.

This allows clarification of aberration correction-related functions of each lens group, suppression of the performance degradation caused by manufacturing errors occurring in the manufacturing process, and reduction in the number of lenses included in each lens group. Specifically, the second lens group serves mainly to perform correction of the axial aberration, and further to keep the exit pupil position with respect to the maximum wide angle state distant from the image plane.

Then, using the positive lens L21 as an aspherical lens makes it possible to achieve satisfactory correction of negative spherical aberration. As described above, the second lens group is taken to be positive-negative structure for suppressing the negative distortion occurring in the maximum wide angle state, and keeping the exit pupil position away from the image plane. It is further desirable that the conditional equation (4) is satisfied in order to maintain a more stable optical quality during the manufacturing process.

The conditional equation (4) defines the composite focal length of the first lens group and the positive lens L21 included in the second lens group.

When an upper limit of the conditional equation (4) is exceeded, the refractive power of the cemented negative lens included in the second lens group becomes greater, and performance degradation caused by misalignment between the positive lens and the negative lens increases prominently, resulting in a difficulty in maintaining the stable optical quality during the manufacturing process. As a result, a higher optical quality may not be attained.

Conversely, when a value is lower than a lower limit of the conditional equation (4), it is difficult to achieve the satisfactory correction of the negative distortion occurring in the maximum wide angle state. This may result in a failure to attain a higher performance.

In the zoom lens according to one embodiment of the present invention, it is desirable that a conditional equation (5) shown below is satisfied.

$$Y\text{max.}/Da < 0.26 \tag{5}$$

where Ymax. is the maximum image height, and Da is a distance from the aperture stop in the maximum wide angle state to the image plane.

This makes it possible to satisfactorily suppress the fluctuations in the off-axial aberration occurring in association with a shift of the second lens group.

As described, with respect the zoom lens of the present embodiment, the following two methods are suggested as those more satisfactorily suppressing the fluctuations in the off-axial aberration occurring in association with shift of the second lens group.

One is to reduce the shift amount of the second lens group required for shifting the image position corresponding to predetermined amounts by increasing the blur correction coefficient.

The other is to make smaller the angle formed by the main ray and the optical axis at the aperture stop position.

The former is attained by increasing the blur correction coefficient, as a method of achieving downsizing of the shift drive mechanism and power saving which are included in the object of the zoom lens of the present embodiment.

The latter is a method intended to achieve the higher performance.

The smaller the angle (or the angle formed by the main ray and the optical axis at the aperture stop position) is, the more it becomes possible to suppress the height change of the off-axial luminous flux passing through the first lens group, which is caused in association with a shift of the second lens group. A restraint of the height change ensures that the off-axial aberration hardly undergoes changes.

It is considerable to attain simply by means of increasing the refractive power of the first lens group and keeping the aperture stop distant from the image plane position. However, any of the above causes the increase in total lens length, thereby disabling downsizing.

The conditional equation (5) is to define the aperture stop position with respect to the maximum wide angle state.

When an upper limit of the conditional equation (5) is exceeded, it becomes impossible to attain the higher performance by providing more satisfactory correction of the fluctuations in the off-axial aberration occurring in association with shift of the second lens group.

In the zoom lens according to one embodiment of the present invention, it is desirable that a conditional equation (6) is satisfied.

$$1.8 < f3/fw < 3 \tag{6}$$

where f3 is a focal length of the third lens group.

This makes it possible to suppress the shift amount required for close-range focusing, and also to realize the high blur correction coefficient.

The conditional equation (6) is to define the focal length of the third lens group.

When an upper limit of the conditional inequality (6) is exceeded, the transverse magnification of the third lens group comes closer to 1, and shift amount of the third lens group required for close-range focusing excessively increases.

Conversely, when a value is lower than a lower limit of the conditional equation (6), the transversal magnification of the third lens group comes closer to 0, and thus the blur correction coefficient decreases, resulting in a failure to sufficiently attain the downsizing and the power saving of the shift drive mechanism for shifting the second lens group in the directions perpendicular to the optical axis.

It is noted that the lower limit of the conditional equation (6) is preferably set to 2 in order to attain the higher performance by reducing the fluctuations in image-plane curvature with the subject distance with respect to the maximum telephoto state.

In the zoom lens according to one embodiment of the present invention, it is desirable that the first lens group includes a negative lens having a concave surface facing toward the image side and the image-side surface is an aspherical shape, and a meniscus-shaped positive lens arranged on the image side of the negative lens with an air space in between and having a negative refractive power and a convex surface facing toward the object side, and that a conditional equation (7) shown below is satisfied.

$$0.18 < D12/fw < 0.3 \tag{7}$$

where D12 is an optical axial length of the air gap formed between the negative lens and the positive lens included in the first lens group.

This makes it possible to attain a further reduction in a thickness of the lens system.

In the zoom lens of the present embodiment, the first lens group mainly performs the correction of off-axial aberration.

The first lens group is arranged to be distant from the aperture stop in the maximum wide angle state, while being arranged to be closer to the aperture stop in the maximum telephoto state, therefore the off-axial luminous flux passes in the maximum wide angle state by keeping distance from the optical axis, whereas it passes the position close to the optical axis in the maximum telephoto state. This difference is utilized to suppress the off-axial aberration fluctuations occurring in association with a view angle change susceptible to occur in the maximum wide angle state, and at the same time, to achieve satisfactory correction of the off-axial aberration fluctuations occurring in association with the change in lens positional state.

In the zoom lens according to one embodiment of the present invention, it is desirable that the image-side lens surface of the negative lens included in the first lens group is formed in the aspherical shape to achieve satisfactory correction of the positive image-plane curvature arising from the positive lens, and consequently the air gap formed between the positive lens and the negative lens is narrowed to satisfy the conditional equation (7).

When an upper limit of the conditional equation (7) is exceeded, the increase in lens thickness of the first lens group is caused, and besides, the off-axial luminous flux passing through the negative lens is kept distant from the optical axis, resulting in the failure to attain the sufficient reduction in lens diameter.

Conversely, when a value is lower than a lower limit of the conditional equation (7), the refractive power of the positive lens becomes greater. The lens should have a greater center thickness for the sake of obtaining a lens configuration adaptable for manufacturing, resulting in less effect on the reduction in thickness of the first lens group. In addition, the performance degradation associated with decentering occurring in the manufacturing process increases prominently, resulting in a difficulty in maintaining the stabled optical quality.

It is noted that the aspherical lens applicable includes an aspherical glass lens formed by molding or machining such as grinding, or a compound lens having aspherical glass-polished lens whose lens surface is covered with a thin aspherical resin layer made of plastics.

In the zoom lens according to one embodiment of the present invention, it is desirable to arrange a low pass filter to prevent an occurrence of moire fringes on the image side of the lens system, and/or an infrared cut filter depending on spectral sensitivity characteristics of a light receiving element.

Specific embodiments of the zoom lens according to the present invention, together with numerical embodiments involving application of actual numerical values to the embodiments, are now descried with reference to the drawings and tables.

It is noted that an aspherical surface is introduced in each of the embodiments, where the shape of the aspherical surface is to be defined by an equation 1 shown below.

$$x = cy^2/(1+(1-(1+\kappa)c^2y^2)^{1/2}) + Ay^4 + By^6 + \quad \text{[Equation 1]}$$

where y is a height from the optical axis, x is a sag amount, c is a curvature, κ is a conic constant, and A, B . . . are aspherical coefficients.

FIG. 1 shows a refractive power allocation of the zoom lens according to each of the embodiments of the present invention, where a first lens group G1 having a negative refractive power, a second lens group G2 having a positive refractive power and a third lens group G3 having a positive refractive power are included in order from the object side. When magnification is varied from the maximum wide angle state W to the maximum telephoto state T, each lens group moves in such a manner that an air gap between the first lens group G1 and the second lens group G2 decreases, and air gap between the second lens group G2 and the third lens group G3 increases. During the zooming, the first lens group G1 moves to the object after once moved to the image side, the second lens group G2 moves to the object side, and the third lens group G3 moves to the image side. The third lens group G3 is supposed to move in such a manner to correct change of image-plane position associated with movement of each lens group, and also move to the object side during close-range focusing.

Figure 2:
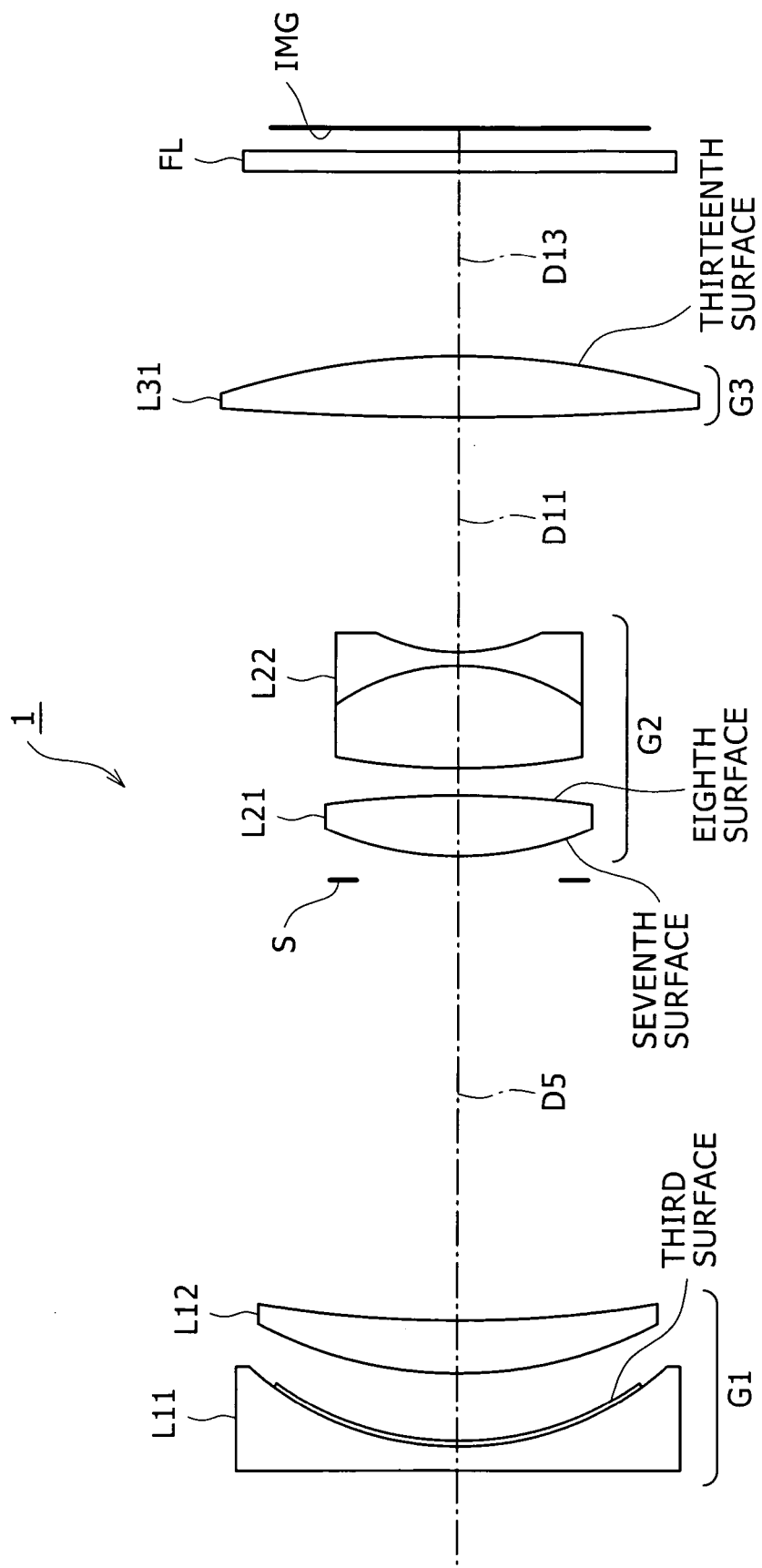
FIG. 2 is a view showing a lens configuration with respect to a first embodiment of the zoom lens according to the present invention.

FIG. 2 shows a lens configuration of a zoom lens 1 according to a first embodiment of the present invention. The first lens group G1 includes, in order from an object side to an image side, a negative lens L11 having a concave surface facing to the image side and a meniscus-shaped positive lens L12 having a convex surface facing toward the object side. The second lens group G2 includes, in order from the object side to the image side, a convexo-convex positive lens L21 and a cemented negative lens L22 made up of a convexo-convex positive lens and a concavo-concave negative lens. The third lens group G3 includes a convexo-convex positive lens L31. The negative lens L11 included in the first lens group G1 is a compound lens whose image-side lens surface is covered with a thin aspherical resin layer made of plastics. An aperture stop S is located close to the object side of the second lens group G2, and a filter FL is placed between an image plane IMG and the third lens group G3. Then, the entire second lens group G2 is shifted in the directions approximately perpendicular to the optical axis to shift the image.

Lens data with respect to a numerical embodiment 1 where actual numerical values are applied to the zoom lens 1 of the first embodiment is listed in Table 1. It is noted that in Table 1 and the subsequent tables showing lens data, "Surface number" indicates a surface specified as the ith from the object side, "Radius of curvature" indicates a radius of curvature of the ith surface from the object side, "Surface gap" indicates an axial surface gap between the ith surface from the object side and the i+1th surface, "Refractive index" indicates a refractive index with respect to a d-line (λ=587.6 nm) of a glass material having the ith surface on the object side, and "Abbe number" indicates an Abbe number with respect to the d-line of the glass material having the ith surface on the object side. Then, "0.0000" presented in reference to the radius of curvature indicates that the surface concerned is of plane shape, and "(Di)" presented in reference to the surface gap indicates that the surface gap concerned is variable.

TABLE 1

| SURFACE NUMBER | RADIUS OF CURVATURE | SURFACE GAP | REFRACTIVE INDEX | ABBE NUMBER |
|---|---|---|---|---|
| 1: | 0.0000 | 0.071 | 1.88300 | 40.8 |
| 2: | 0.9913 | 0.013 | 1.53420 | 41.7 |
| 3: | 0.9135 | 0.251 | | |

TABLE 1-continued

| SURFACE NUMBER | RADIUS OF CURVATURE | SURFACE GAP | REFRACTIVE INDEX | ABBE NUMBER |
|---|---|---|---|---|
| 4: | 1.4689 | 0.157 | 1.92286 | 20.8 |
| 5: | 3.3286 | (D5) | | |
| 6: | 0.0000 | 0.090 | APERTURE STOP | |
| 7: | 0.9327 | 0.201 | 1.61881 | 63.9 |
| 8: | −2.3536 | 0.086 | | |
| 9: | 1.8722 | 0.336 | 1.83400 | 37.3 |
| 10: | −0.7610 | 0.052 | 1.71736 | 29.5 |
| 11: | 0.5695 | (D11) | | |
| 12: | 7.1400 | 0.201 | 1.77377 | 47.2 |
| 13: | −2.4621 | (D13) | | |
| 14: | 0.0000 | 0.103 | 1.51680 | 64.2 |
| 15: | 0.0000 | (Bf) | | |

The image-side resin surface (the third surface) of the negative lens L11 included in the first lens group G1, the both surfaces (the seventh and the eighth surfaces) of the positive lens L21 included in the second lens group G2, and the image-side surface (the thirteenth surface) of the positive lens L3 included in the third lens group G3 are of aspherical shape. As such, the fourth-, the sixth-, the eighth- and the tenth-order aspherical coefficients A, B, C and D of each surfaces with respect to the numerical embodiment 1 are listed in Table 2, together with their conical constants κ. It is noted that in Table 2 and the subsequent aspherical coefficient tables, "E-i" is an exponential notation with base 10, in other words, "10−i", specifically, "0.12345E−05" represents "0.12345×10−5", for instance.

TABLE 2

| THIRD SURFACE | κ = 0.000000 D = 0.768007E−01 | A = −0.171398E+00 | B = +0.193059E−01 | C = −0.264773E+00 |
| SEVENTH SURFACE | κ = 0.000000 D = −0.377382E+01 | A = −0.241569E+00 | B = −0.386951E+00 | C = +0.852781E+00 |
| EIGHTH SURFACE | κ = 0.000000 D = +0.000000E+00 | A = +0.106028E+00 | B = −0.173016E+00 | C = +0.000000E+00 |
| THIRTEENTH SURFACE | κ = 0.000000 D = −0.504031E+00 | A = +0.120524E+00 | B = −0.326640E+00 | C = +0.650050E+00 |

With respect to the zoom lens 1, when zooming from the maximum wide angle state to the maximum telephoto state, a surface gap D5 between the first lens group G1 and the second lens group G2 (the aperture stop S), a surface gap D11 between the second lens group G2 and the third lens group G3 and a surface gap D13 between the third lens group G3 and the filter FL are changed. As such, values for each of the surface gaps with respect to the numerical embodiment 1 in the maximum wide angle state (f=1.000), the mid-focal length position (f=1.632) and the maximum telephoto state (f=2.825) are listed in Table 3, together with focal lengths f, F-numbers FNO and angles of view 2ω.

TABLE 3

| f | 1.000 | ~ | 1.632 | ~ | 2.825 |
|---|---|---|---|---|---|
| FNO | 2.88 | ~ | 3.83 | ~ | 5.63 |
| 2ω | 64.66 | ~ | 40.03 | ~ | 23.64° |
| D5 | 1.467 | | 0.731 | | 0.240 |
| D11 | 0.785 | | 1.563 | | 2.870 |
| D13 | 0.489 | | 0.419 | | 0.285 |
| Bf | 0.170 | | 0.170 | | 0.170 |

Each numerical value for finding each condition of the conditional equations (1) to (7) with respect to the numerical embodiment 1 are listed in Table 4, together with corresponding values of each conditional equation.

TABLE 4 f1 = −1.971
faw = 0.737
f3 = 2.388
(1) TLw/TLt = 0.872
(2) |f1|/ft = 0.698
(3) RN2/Ds = 0.744
(4) fw/faw = 1.356
(5) Ymax./Da = 0.241
(6) f3/fw = 2.388
(7) D12/fw = 0.251

Figure 3:
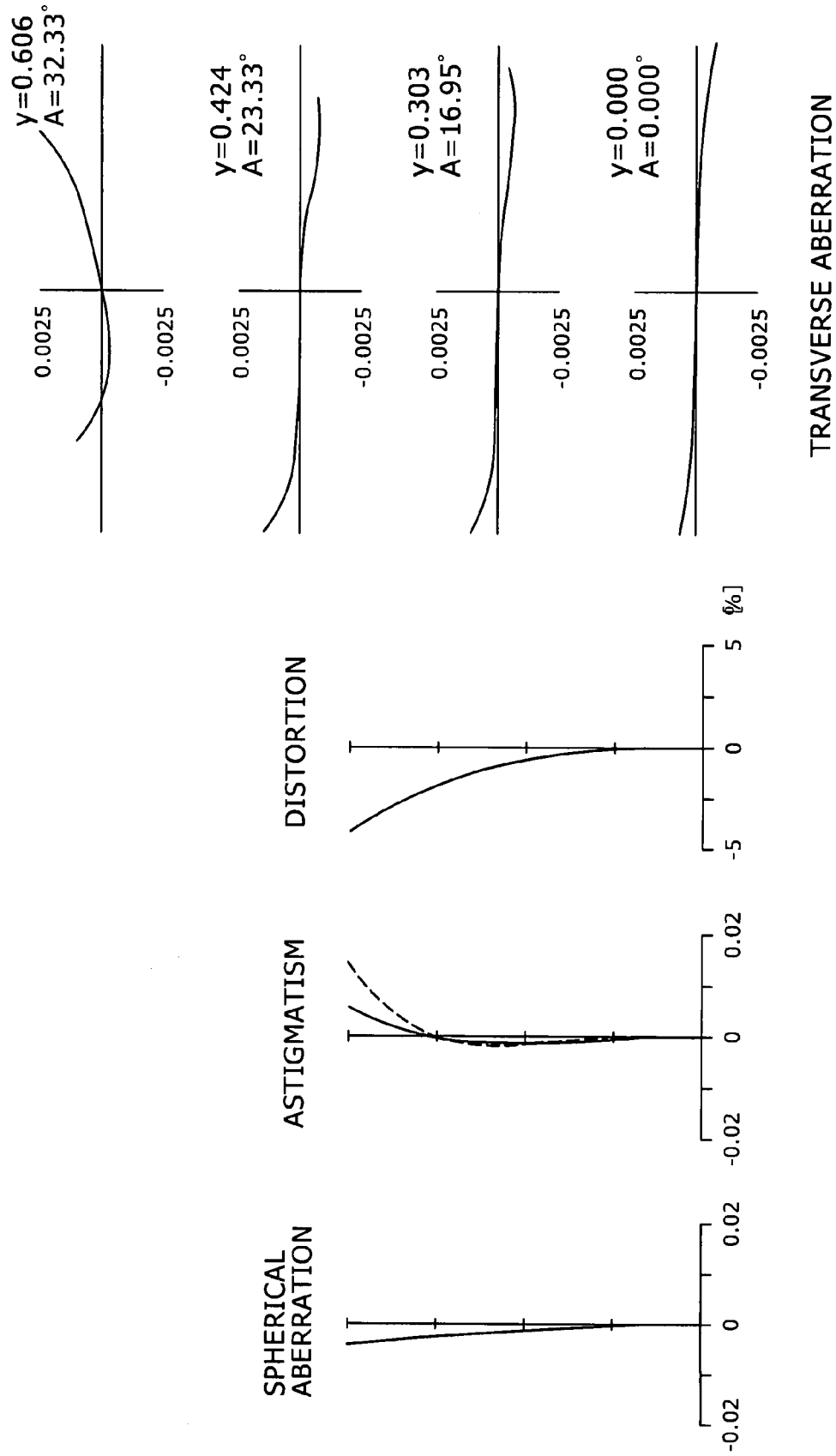
FIGS. 3 to 5 respectively illustrate graphs of various aberrations with respect to a numerical embodiment 1 using actual numerical values to the first embodiment, where graphs in FIG. 3 show spherical aberration, astigmatism, distortion and transverse aberration at a maximum wide angle state.
Figure 4:
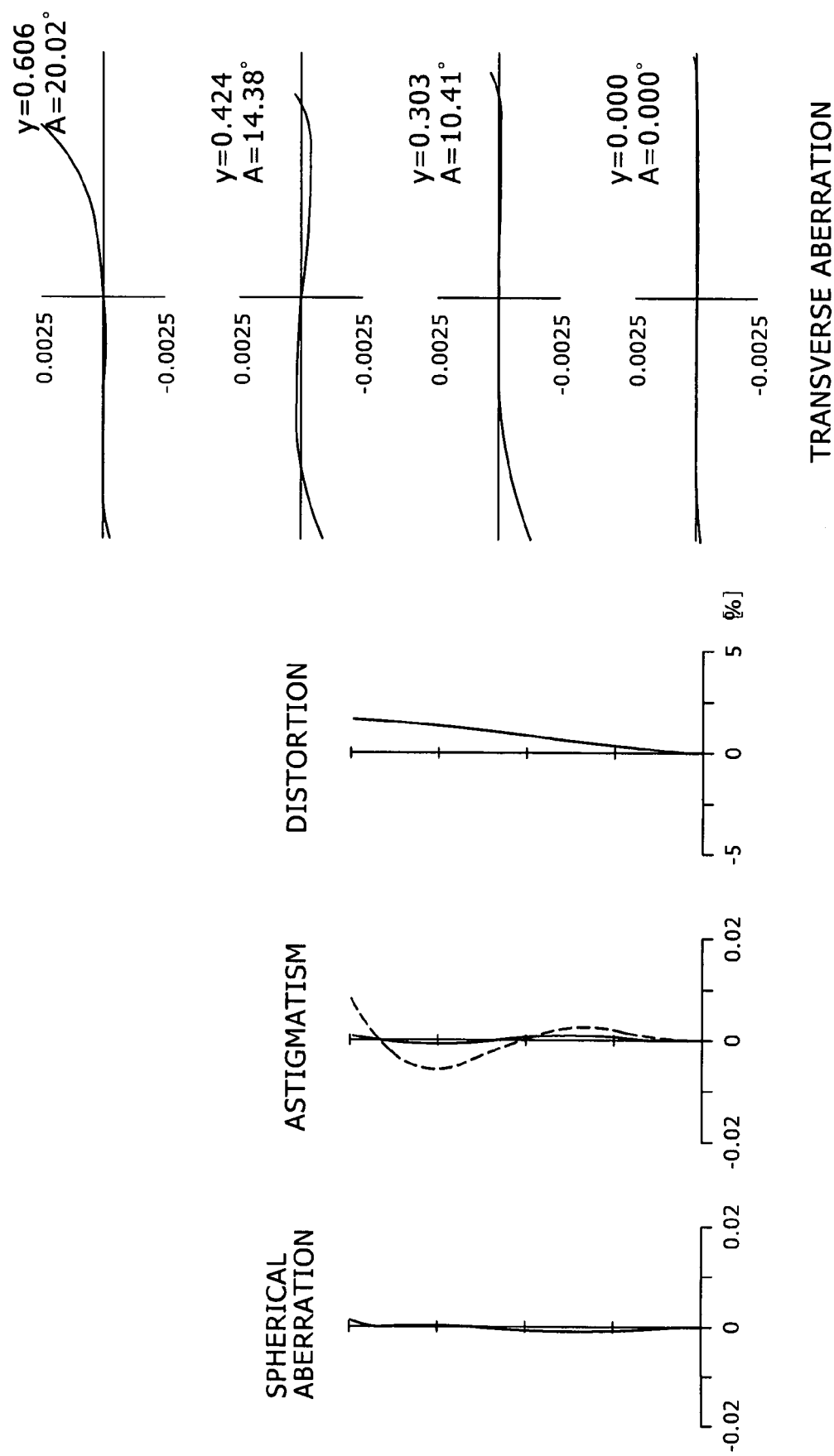
Figure 5:
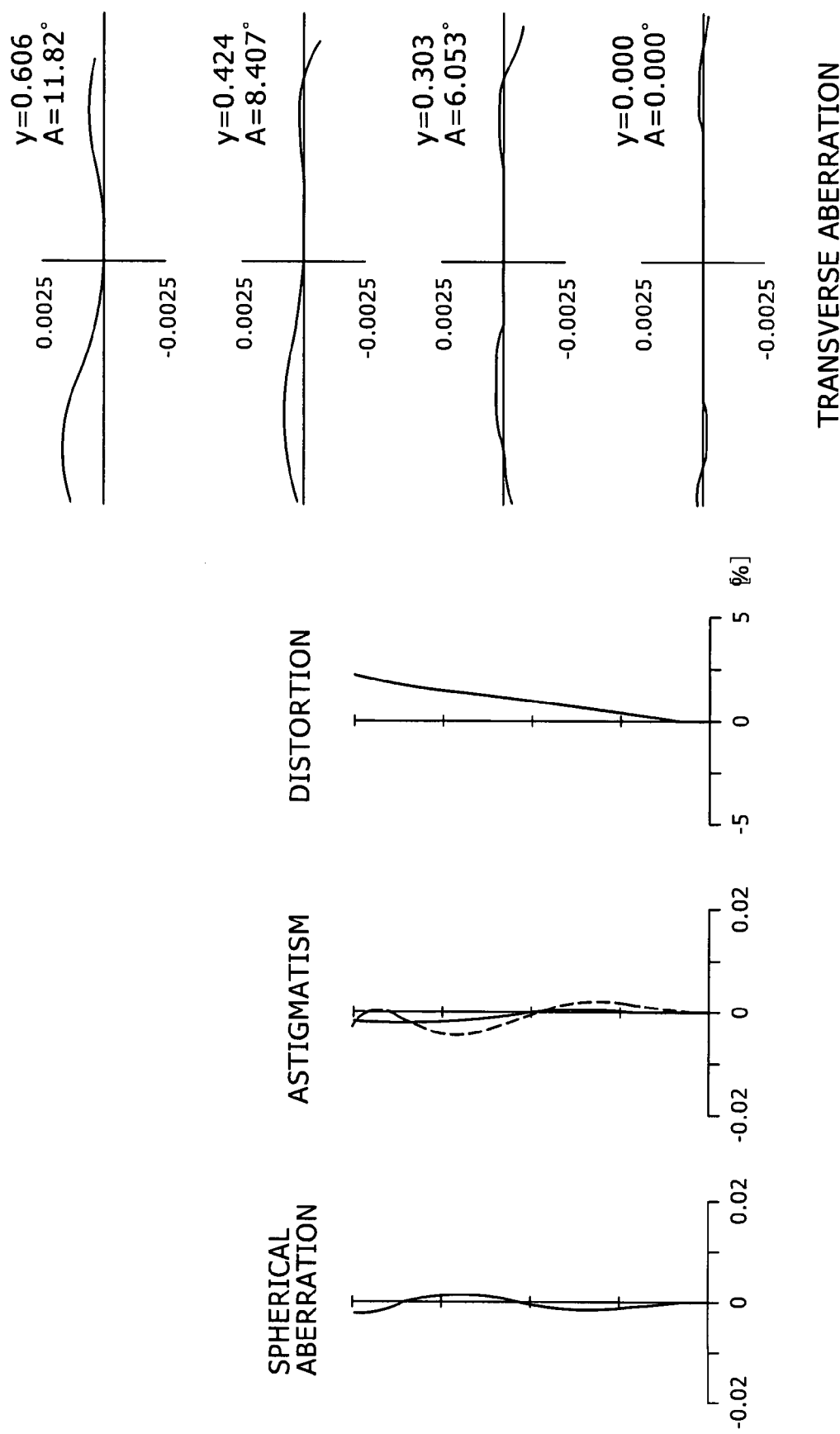

FIGS. 3 to 5 respectively illustrate graphs of various aberrations in an in-focus condition at infinity with respect to the numerical embodiment 1, where FIG. 3 shows aberrations in the maximum wide angle state (f=1.000), FIG. 4 show aberrations in the mid-focal length position (f=1.632), and those in FIG. 5 show aberrations in the maximum telephoto state (f=2.825).

Referring to each aberration graph in FIGS. 3 to 5, the solid line in each spherical aberration graph indicates a spherical aberration, while the solid line and the broken line in each astigmatism graph indicate a sagittal image plane and a meridional image plane, respectively. In the transverse aberration graphs, A indicates an angle of view, and y indicates an image height.

Figure 6:
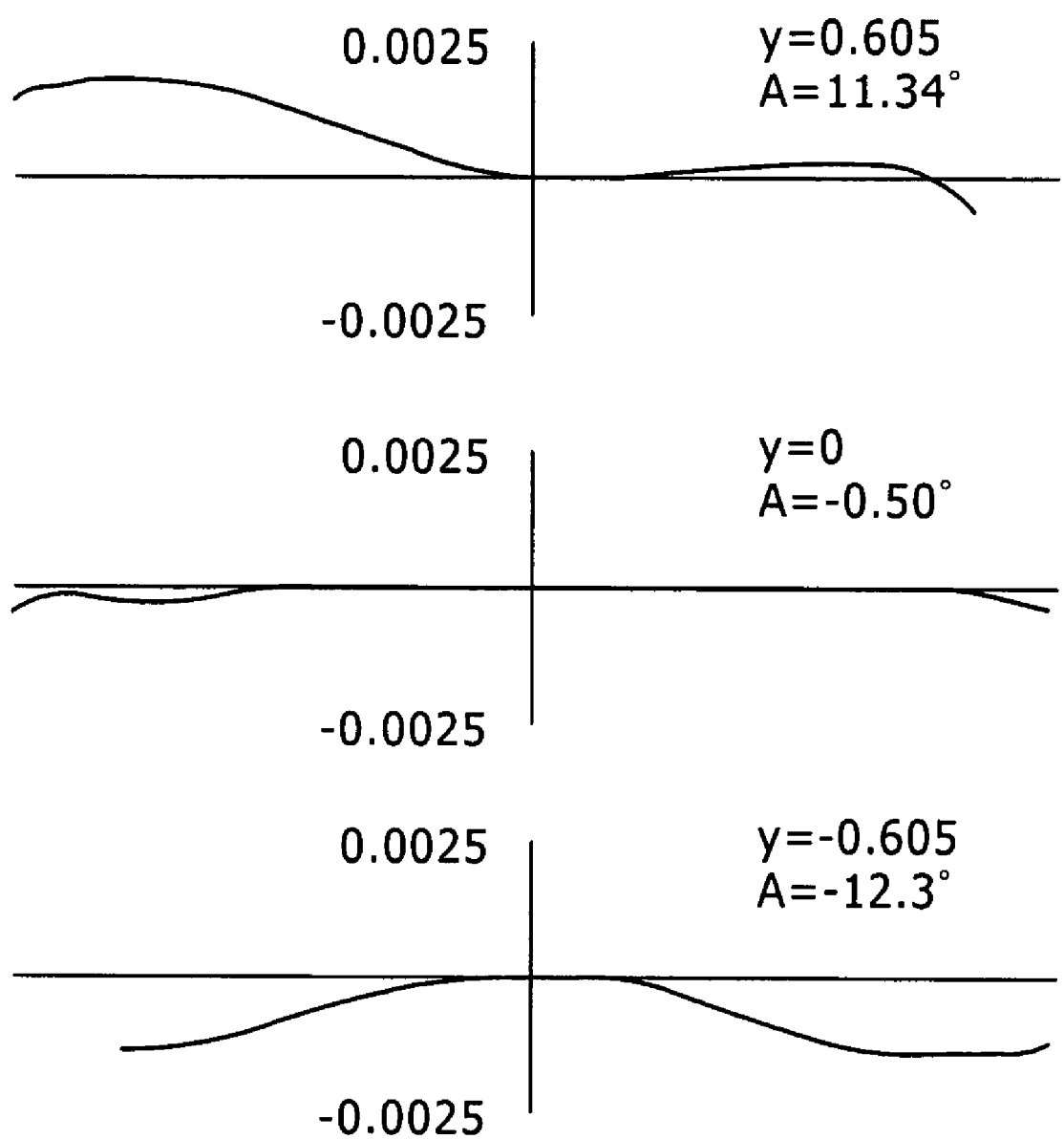
FIGS. 6 to 8 respectively illustrate graphs of transverse aberration in a condition equivalent to around 0.5-degree lens shift with respect to the numerical embodiment 1 using actual numerical values to the first embodiment, where graphs in FIG. 6 show transverse aberration in a maximum wide angle state.
Figure 7:
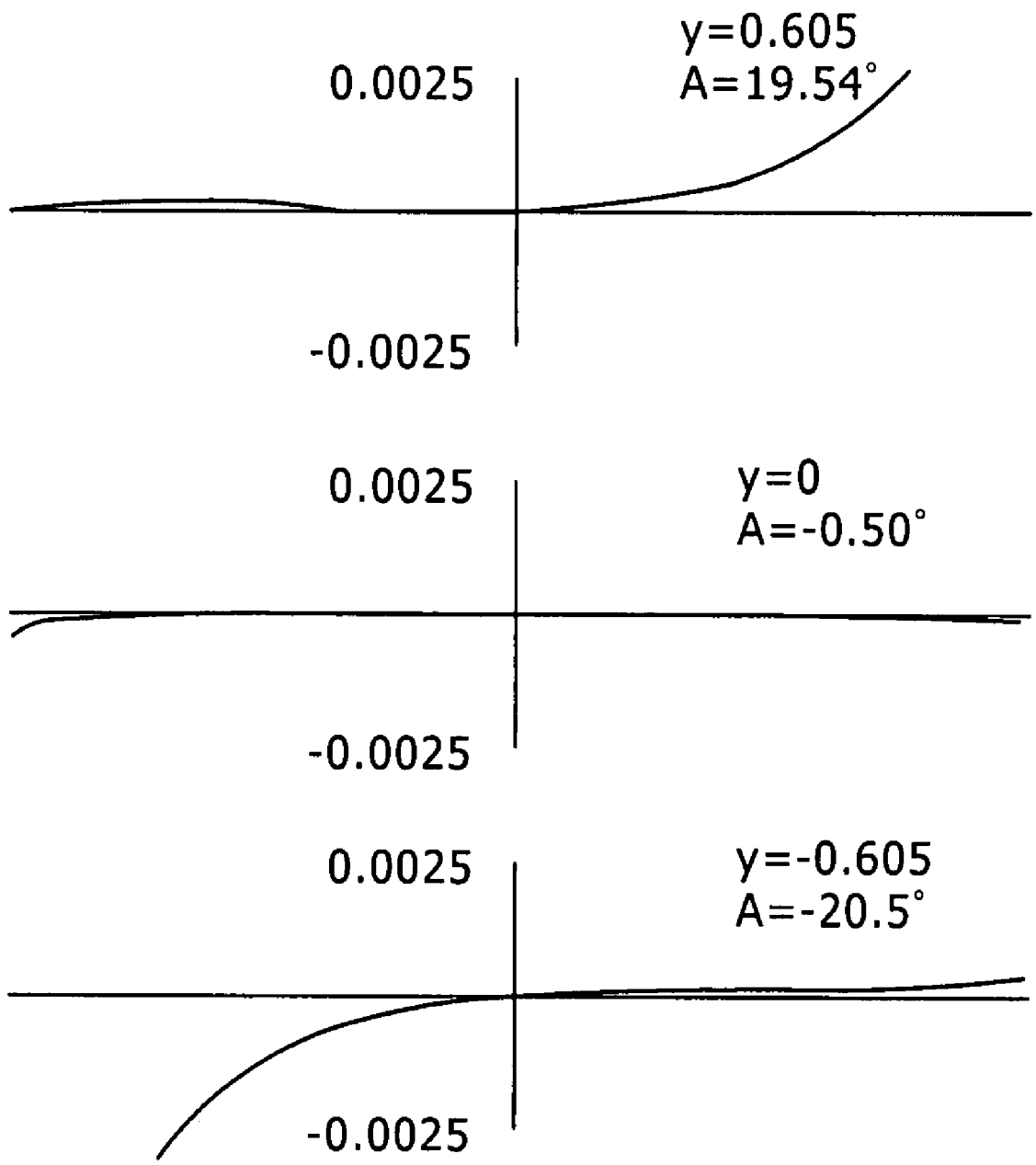
Figure 8:
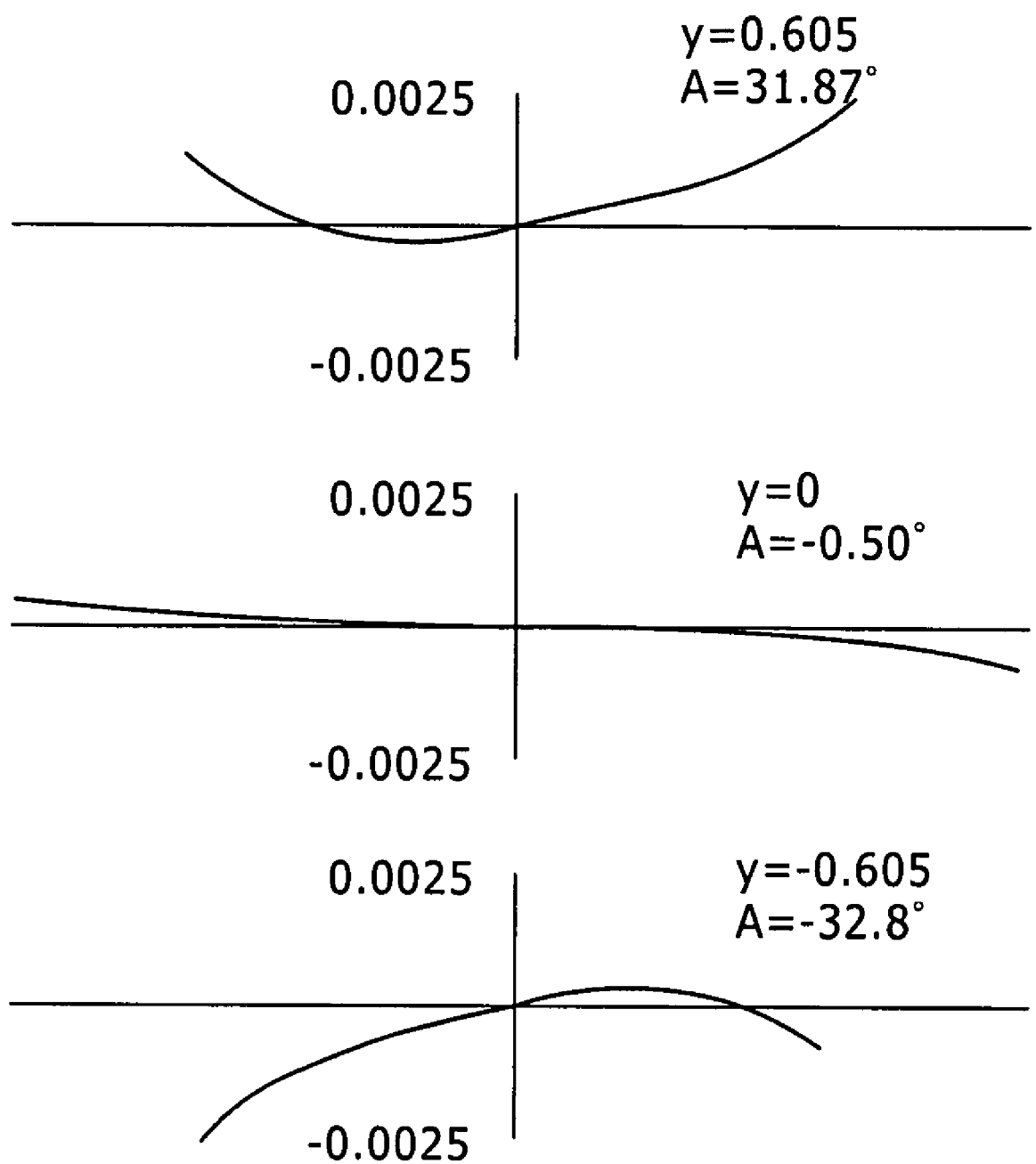

FIGS. 6 to 8 respectively illustrate graphs of transverse aberration in a condition equivalent to 0.5-degree lens shift with respect to the numerical embodiment 1 in the in-focus condition at infinity, where graphs in FIG. 6 show transverse aberration in the maximum wide angle state (f=1.000), those in FIG. 7 show transverse aberration in the mid-focal length position (f=1.632), and those in FIG. 8 show transverse aberration in the maximum telephoto state (f=2.825).

It is obviously seen from each aberration graph that the numerical embodiment 1 enables satisfactory correction of various aberrations, and provides excellent image forming performance.

Figure 9:
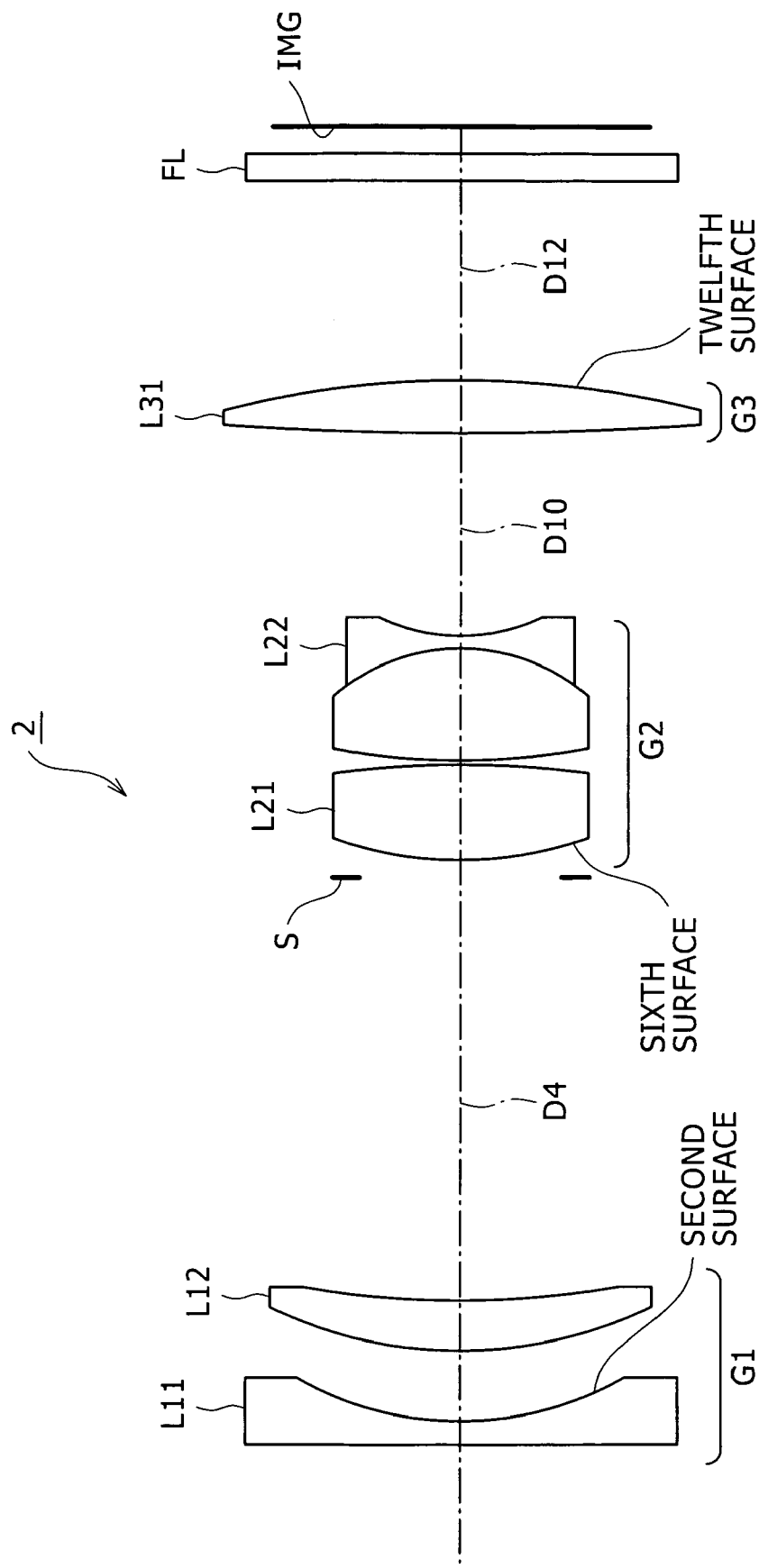
FIG. 9 shows a lens configuration with respect to a second embodiment of the zoom lens according to the present invention.

FIG. 9 shows a lens configuration of a zoom lens 2 according to a second embodiment of the present invention. The first lens group G1 includes in order from the object side to the image side, a negative lens L11 having a concave surface facing toward the image side and a meniscus-shaped positive lens L12 having a convex surface facing toward the object side. The second lens group G2 includes in order from the object side to the image side, a convexo-convex positive lens L21 and a cemented negative lens L22 made up of a convexo-convex positive lens and concavo-concave negative lens. The third lens group G3 includes a convexo-convex positive lens L31. An aperture stop S is located close to the object side of the second lens group G2, and a filter FL is placed between the image plane IMG and the third lens group G3. Then, the entire second lens group G2 is shifted in the directions approximately perpendicular to the optical axis to shift the image.

Lens data with respect to a numerical embodiment 2 involving application of the actual numerical values to the zoom lens 2 of the second embodiment is listed in Table 5.

TABLE 5

| SURFACE NUMBER | RADIUS OF CURVATURE | SURFACE GAP | REFRACTIVE INDEX | ABBE NUMBER |
|---|---|---|---|---|
| 1: | 0.0000 | 0.082 | 1.88300 | 40.8 |
| 2: | 0.9303 | 0.244 | | |
| 3: | 1.4943 | 0.163 | 1.92286 | 20.8 |
| 4: | 3.6108 | (D4) | | |
| 5: | 0.0000 | 0.088 | APERTURE STOP | |
| 6: | 1.0545 | 0.309 | 1.61881 | 63.9 |
| 7: | −2.4099 | 0.013 | | |
| 8: | 1.4721 | 0.369 | 1.83400 | 37.3 |
| 9: | −0.6303 | 0.050 | 1.71736 | 29.5 |
| 10: | 0.5423 | (D10) | | |
| 11: | 5.7942 | 0.188 | 1.77377 | 47.2 |
| 12: | −3.0570 | (D12) | | |
| 13: | 0.0000 | 0.117 | 1.51680 | 64.2 |
| 14: | 0.0000 | (Bf) | | |

The image-side surface (the second surface) of the negative lens L11 included in the first lens group G1, the object-side surface (the sixth surface) of the positive lens L21 included in the second lens group G2 and the image-side surface (the twelfth surface) of the positive lens L3 included in the third lens group G3 are of aspherical shape. As such, the fourth-, the sixth-, the eighth- and the tenth-order aspherical coefficients A, B, C and D of each of the surfaces with respect to the numerical embodiment 2 are listed in Table 6, together with their conical constants $\kappa$.

TABLE 6

| SECOND SURFACE | $\kappa$ = −1.464827<br>D = +0.729075E+00 | A = +0.104447E+00 | B = +0.177067E−01 | C = −0.599480E+00 |
|---|---|---|---|---|
| SIXTH SURFACE | $\kappa$ = −0.912092<br>D = −0.577169E+01 | A = −0.218992E+00 | B = −0.243218E+00 | C = +0.718317E+00 |
| TWELFTH SURFACE | $\kappa$ = 0.000000<br>D = +0.631424E+00 | A = +0.942987E+00 | B = +0.397661E+00 | C = −0.797949E+00 |

With respect to the zoom lens 2, when zooming from the maximum wide angle state to the maximum telephoto state, a surface gap D4 between the first lens group G1 and the second lens group G2 (the aperture stop S), a surface gap D10 between the second lens group G2 and the third lens group G3 and a surface gap D12 between the third lens group G3 and the filter FL are changed. As such, values for each of the surface gaps with respect to the numerical embodiment 2 in the maximum wide angle state (f=1.000), the mid-focal length position (f=1.702) and the maximum telephoto state (f=2.826) are listed in Table 7, together with focal lengths f, F-numbers FNO and angles of view 2ω.

TABLE 7

| f | 1.000 | ~ | 1.702 | ~ | 2.826 |
|---|---|---|---|---|---|
| FNO | 2.88 | ~ | 4.03 | ~ | 5.75 |
| 2ω | 63.68 | ~ | 38.35 | ~ | 23.64° |
| D4 | 1.377 | | 0.672 | | 0.202 |
| D10 | 0.667 | | 1.630 | | 2.802 |
| D12 | 0.559 | | 0.378 | | 0.265 |
| Bf | 0.164 | | 0.164 | | 0.164 |

Each numerical value for finding each condition of the conditional equations (1) to (7) with respect to the numerical embodiment 2 are listed in Table 8, together with corresponding values to each conditional equation.

TABLE 8 f1 = −1.971
faw = 0.877
f3 = 2.611
(1) TLw/TLt = 0.868
(2) |f1|/ft = 0.697
(3) RN2/Ds = 0.654
(4) fw/faw = 1.140
(5) Ymax./Da = 0.235
(6) f3/fw = 2.611
(7) D12/fw = 0.244

Figure 10:
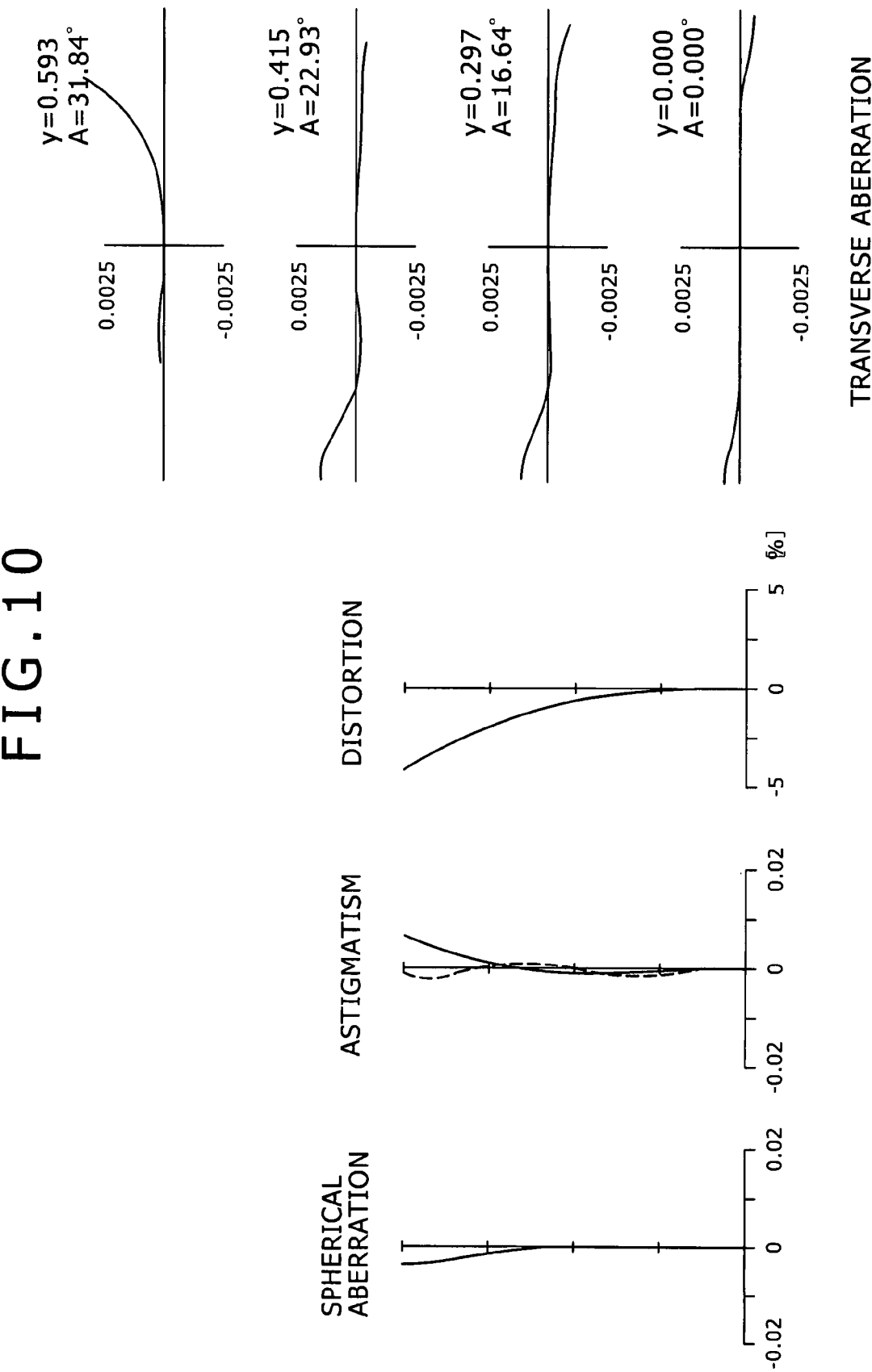
FIGS. 10 to 12 respectively illustrate graphs of various aberrations with respect to a numerical embodiment 2 using actual numerical values to the second embodiment, where graphs in FIG. 10 show spherical aberration, astigmatism, distortion and transverse aberration in a maximum wide angle state.
Figure 11:
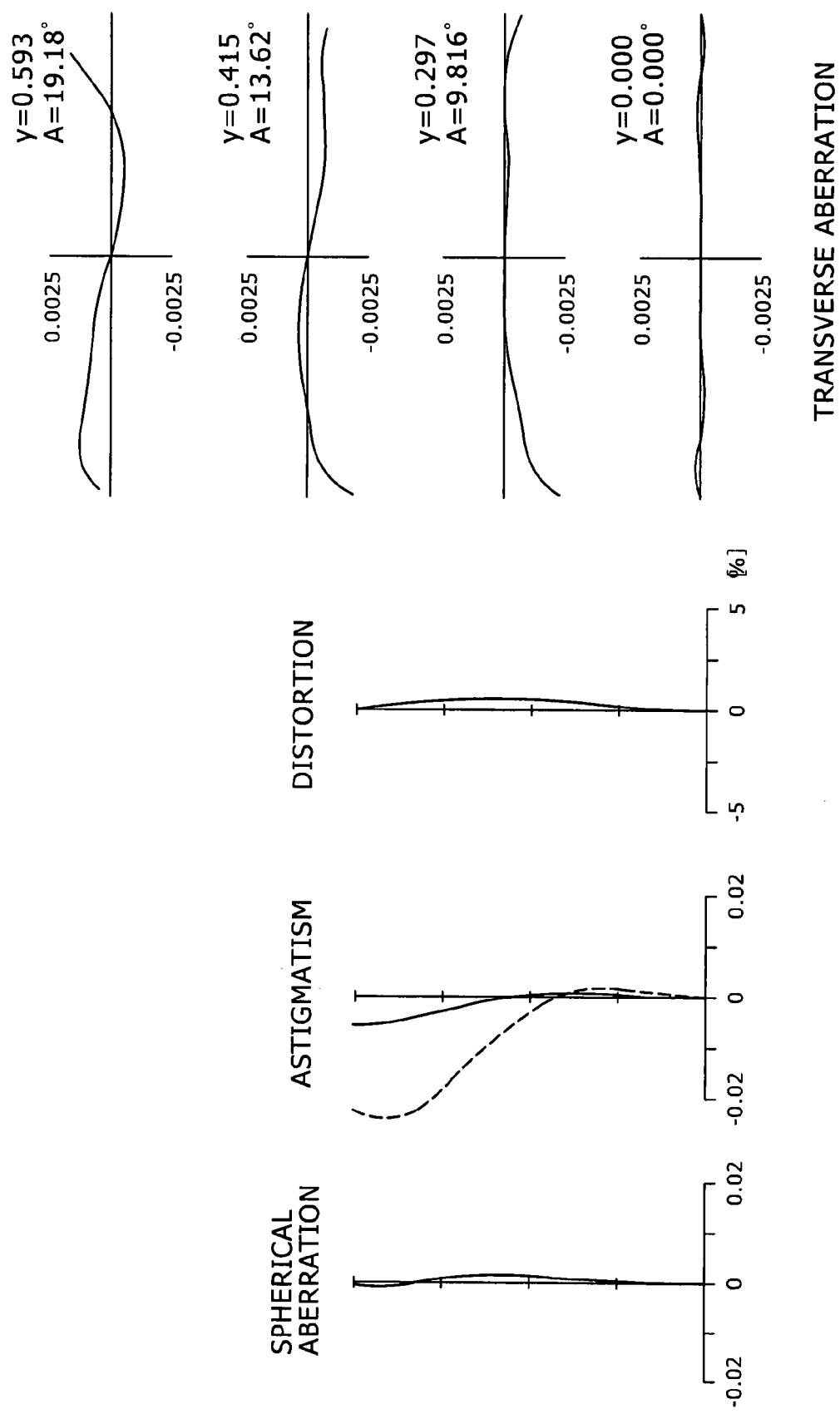
Figure 12:
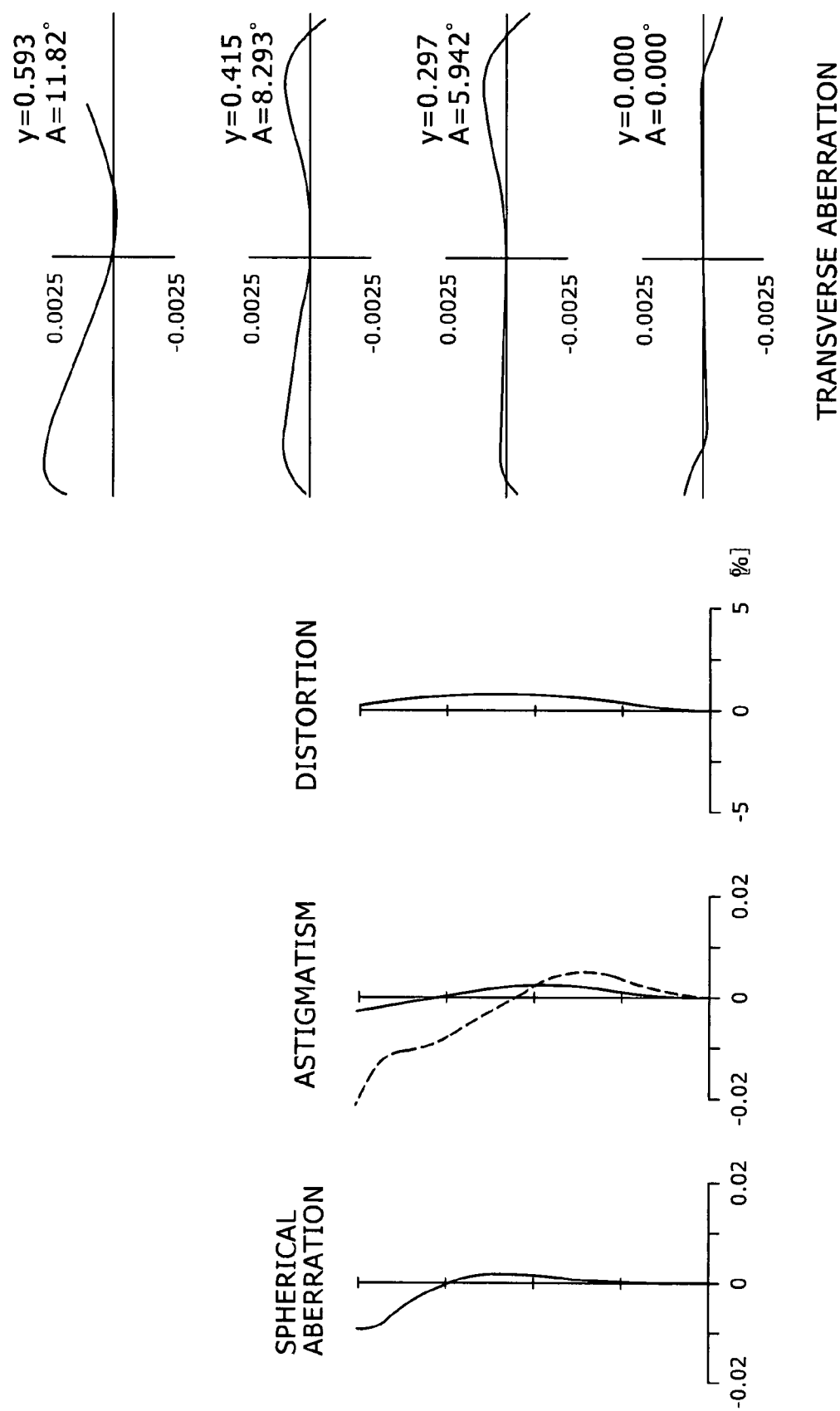

FIGS. 10 to 12 respectively illustrate graphs of various aberrations in an in-focus condition at infinity with respect to the numerical embodiment 2, where graphs in FIG. 10 show various aberrations in the maximum wide angle state (f=1.000), those in FIG. 11 show various aberrations in the mid-focal length position (f=1.702), and those in FIG. 12 show various aberrations in the maximum telephoto state (f=2.826).

Referring to each aberration graph in FIGS. 10 to 12, the solid line in each spherical aberration graph indicates aspherical aberration, while the solid line and the broken line in each astigmatism graph indicate a sagittal image plane and a meridional image plane, respectively. In the transverse aberration graphs, A indicates an angle of view, and y indicates an image height.

Figure 13:
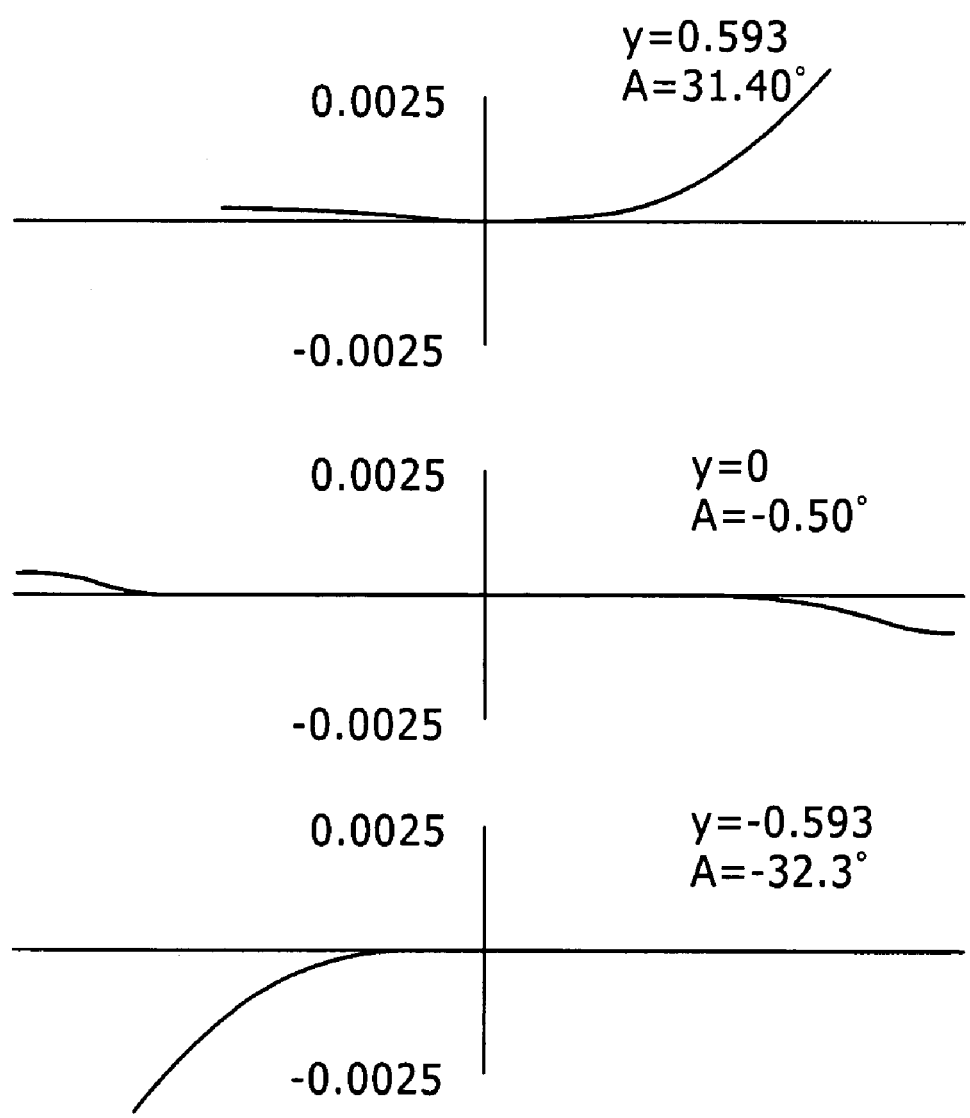
FIGS. 13 to 15 respectively illustrate graphs of transverse aberration in a condition equivalent to around 0.5-degree lens shift with respect to the numerical embodiment 2 using actual numerical values to the second embodiment, where graphs in FIG. 13 show transverse aberration at a maximum wide angle state.
Figure 14:
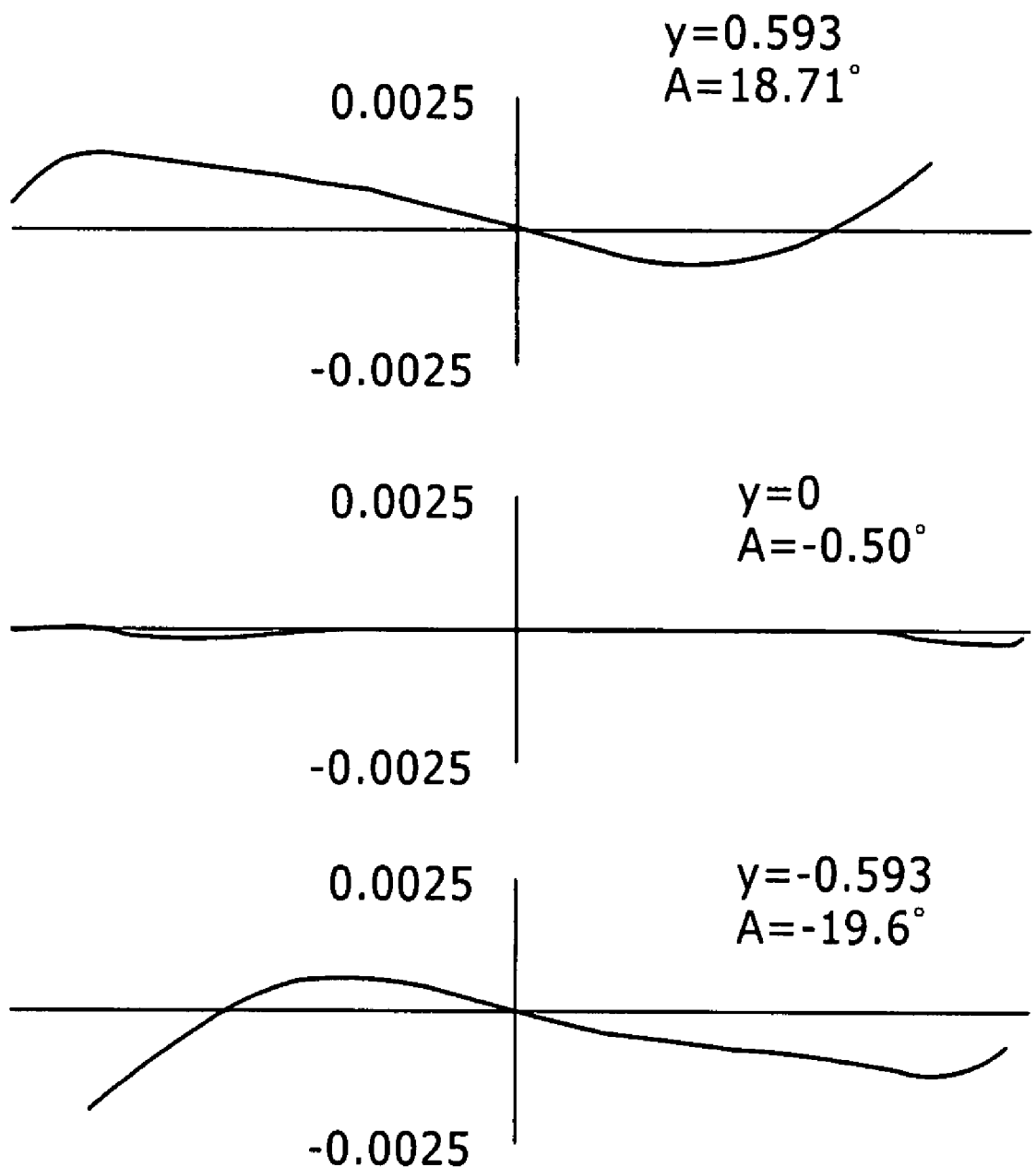
Figure 15:
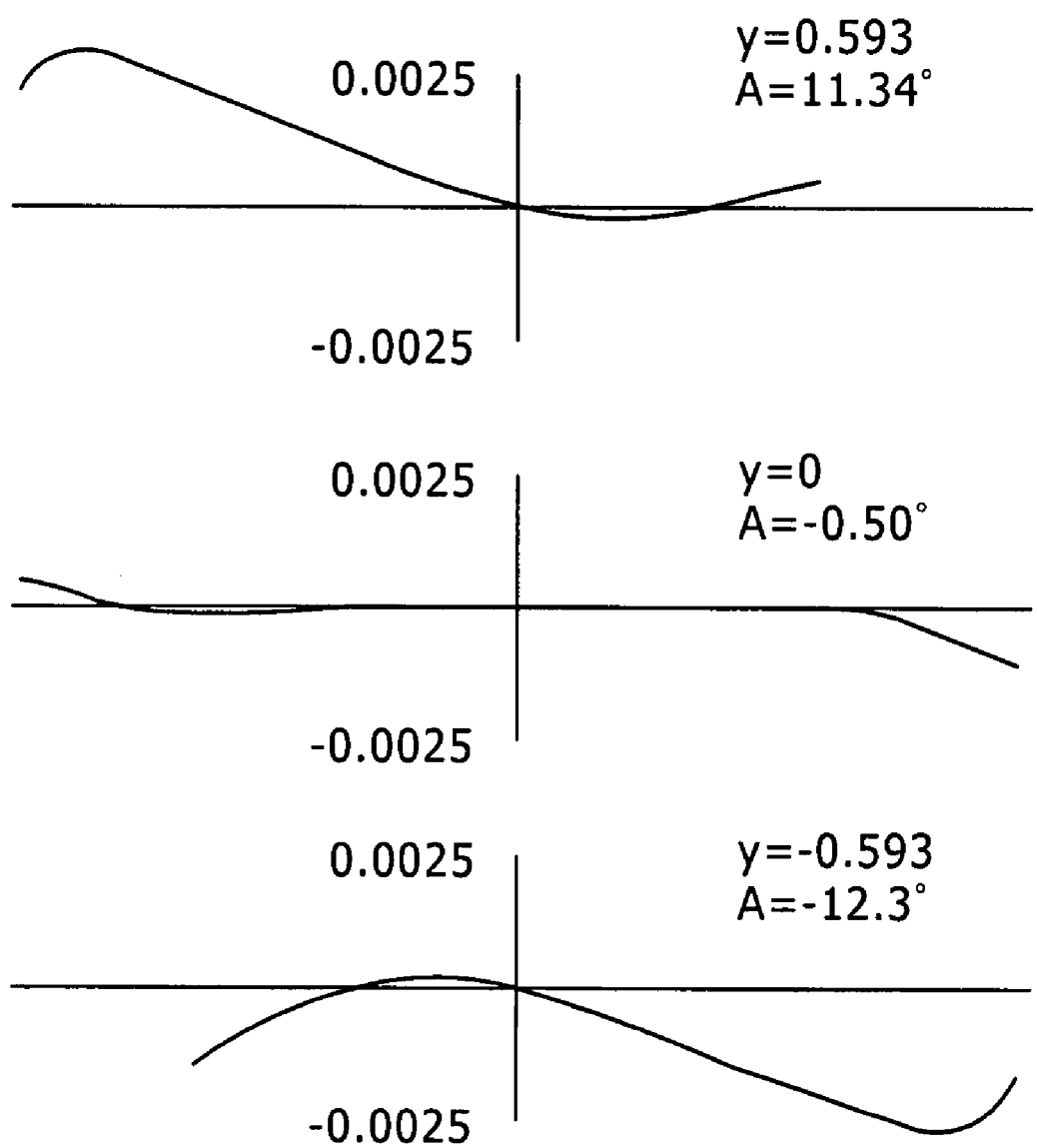

FIGS. 13 to 15 respectively illustrate graphs of transverse aberration in a condition equivalent to around 0.5-degree lens shift with respect to the numerical embodiment 2 in the in-focus condition at infinity, where graphs in FIG. 13 show transverse aberration in the maximum wide angle state (f=1.000), those in FIG. 14 show transverse aberration in the mid-focal length position (f=1.702), and those in FIG. 15 show transverse aberration in the maximum telephoto state (f=2.826).

It is obviously seen from each aberration graph that in the numerical embodiment 2, various aberrations are corrected sufficiently, and excellent imaging performance is achieved.

Figure 16:
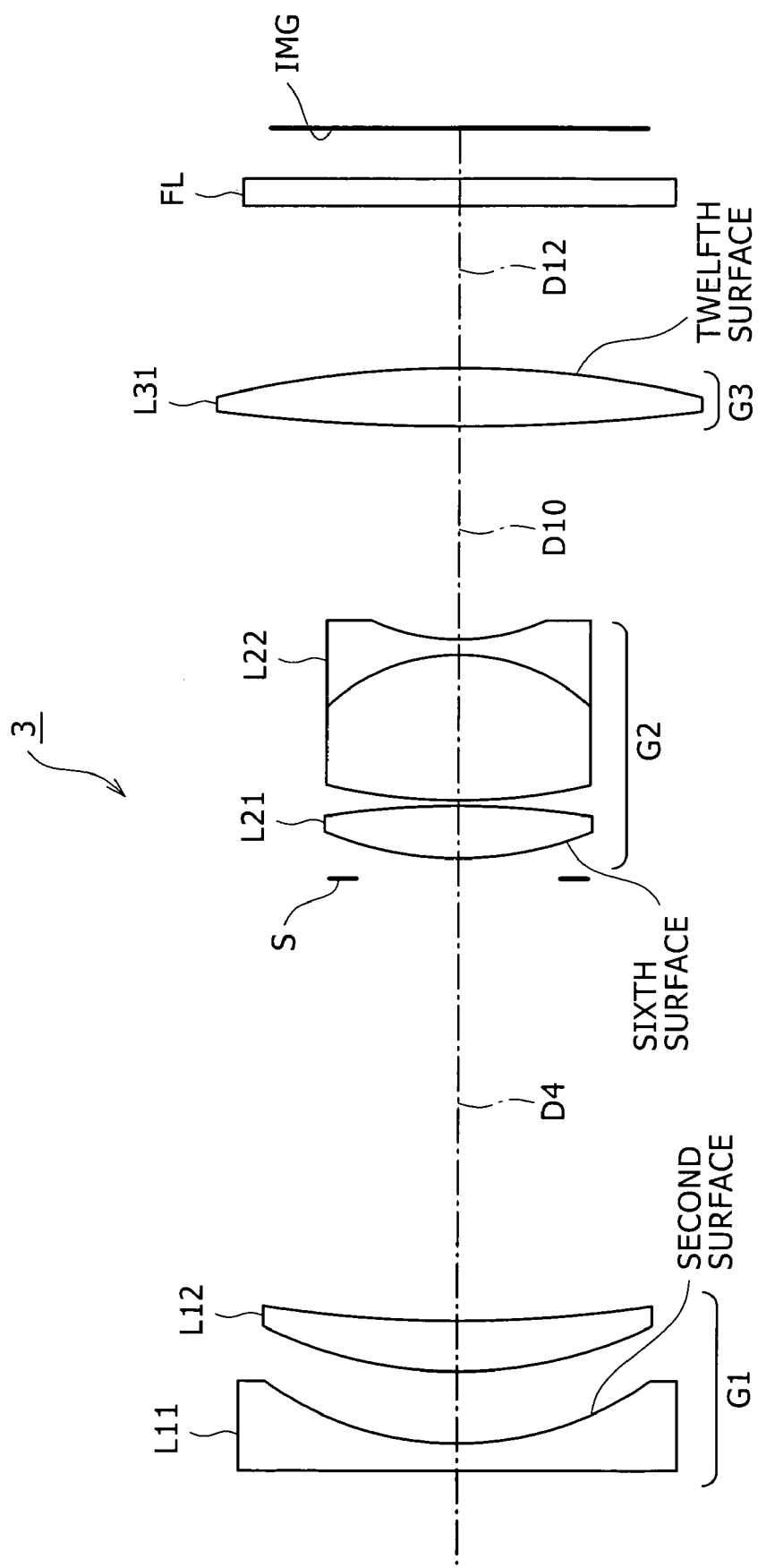
FIG. 16 shows a lens configuration with respect to a third embodiment of the zoom lens according to the present invention.

FIG. 16 shows a lens configuration of a zoom lens 3 according to a third embodiment of the present invention. The first lens group G1 includes in order from the object side to the image side, a negative lens L11 having a concave surface facing toward the image and a meniscus-shaped positive lens L12 having a convex surface facing toward the object. The second lens group G2 includes in order from the object side to the image side, a convexo-convex positive lens L21 and a cemented negative lens L22 made up of a convexo-convex positive lens and a concavo-concave negative lens. The third lens group G3 includes a convexo-convex positive lens L31. An aperture stop S is located close to the object side of the second lens group G2, and a filter FL is placed between the image plane IMG and the third lens group G3. Then, the entire second lens group G2 is shifted in the directions approximately perpendicular to the optical axis to shift the image.

Lens data with respect to a numerical embodiment 3 where the actual numerical values are applied to the zoom lens 3 of the third embodiment is listed in Table 9.

TABLE 9

| SURFACE NUMBER | RADIUS OF CURVATURE | SURFACE GAP | REFRACTIVE INDEX | ABBE NUMBER |
|---|---|---|---|---|
| 1: | 0.0000 | 0.082 | 1.88300 | 40.8 |
| 2: | 0.9550 | 0.233 | | |
| 3: | 1.4850 | 0.155 | 1.92286 | 20.8 |
| 4: | 3.6271 | (D4) | | |
| 5: | 0.0000 | 0.088 | APERTURE STOP | |
| 6: | 1.0509 | 0.175 | 1.61881 | 63.9 |
| 7: | −2.6369 | 0.013 | | |
| 8: | 1.6697 | 0.466 | 1.83400 | 37.3 |
| 9: | −0.6132 | 0.050 | 1.71736 | 29.5 |
| 10: | 0.5574 | (D10) | | |
| 11: | 4.8285 | 0.209 | 1.77377 | 47.2 |
| 12: | −2.7073 | (D12) | | |
| 13: | 0.0000 | 0.101 | 1.51680 | 64.2 |
| 14: | 0.0000 | (Bf) | | |

The image-side surface (the second surface) of the negative lens L11 included in the first lens group G1, the object-side surface (the sixth surface) of the positive lens L21 included in the second lens group G2 and the image-side surface (the twelfth surface) of the positive lens L3 included in the third lens group G3 are of aspherical shape. As such, the fourth-, the sixth-, the eighth- and the tenth-order aspherical coefficients A, B, C and D of each of the surfaces with respect to the numerical embodiment 3 are listed in Table 10, together with their conical constants κ.

TABLE 10

| SECOND SURFACE | κ = 0.000000 D = +0.242015E+00 | A = −0.106109E+00 | B = +0.843253E−01 | C = −0.411705E+00 |
|---|---|---|---|---|
| SIXTH SURFACE | κ = 0.000000 D = +0.220392E+00 | A = −0.302771E+00 | B = −0.156961E+00 | C = +0.805435E+00 |
| TWELFTH SURFACE | κ = 0.000000 D = −0.649556E+00 | A = +0.108650E+00 | B = −0.353476E+00 | C = +0.778293E+00 |

With respect to the zoom lens 3, when zooming from the maximum wide angle state to the maximum telephoto state, a surface gap D4 between the first lens group G1 and the second lens group G2 (the aperture stop S), a surface gap D10 between the second lens group G2 and the third lens group G3 and a surface gap D12 between the third lens group G3 and the filter FL are changed. As such, values for each of the surface gaps with respect to the numerical embodiment 3 in the maximum wide angle state (f=1.000), the mid-focal length position (f=1.702) and the maximum telephoto state (f=2.820) are listed in Table 11, together with focal lengths f, F-numbers FNO and angles of view 2ω.

TABLE 11

| f | 1.00 | ~ | 1.702 | ~ | 2.820 |
|---|---|---|---|---|---|
| FNO | 2.88 | ~ | 4.03 | ~ | 5.75 |
| 2ω | 63.64 | ~ | 37.84 | ~ | 23.28° |
| f | 1.000 | ~ | 1.702 | ~ | 2.820 |
| D4 | 1.435 | | 0.659 | | 0.214 |
| D10 | 0.697 | | 1.563 | | 2.756 |
| D12 | 0.503 | | 0.413 | | 0.283 |
| Bf | 0.166 | | 0.166 | | 0.166 |

Each numerical value for finding each condition of the conditional equations (1) to (7) with respect to the numerical embodiment 3 are listed in Table 12, together with corresponding values to each conditional equation.

TABLE 12

| f1 = −2.075 |
|---|
| faw = 0.895 |
| f3 = 2.269 |
| (1) TLw/TLt = 0.876 |
| (2) \|f1\|/ft = 0.734 |
| (3) RN2/Ds = 0.704 |
| (4) fw/faw = 1.118 |
| (5) Ymax./Da = 0.240 |
| (6) f3/fw = 2.269 |
| (7) D12/fw = 0.233 |

Figure 17:
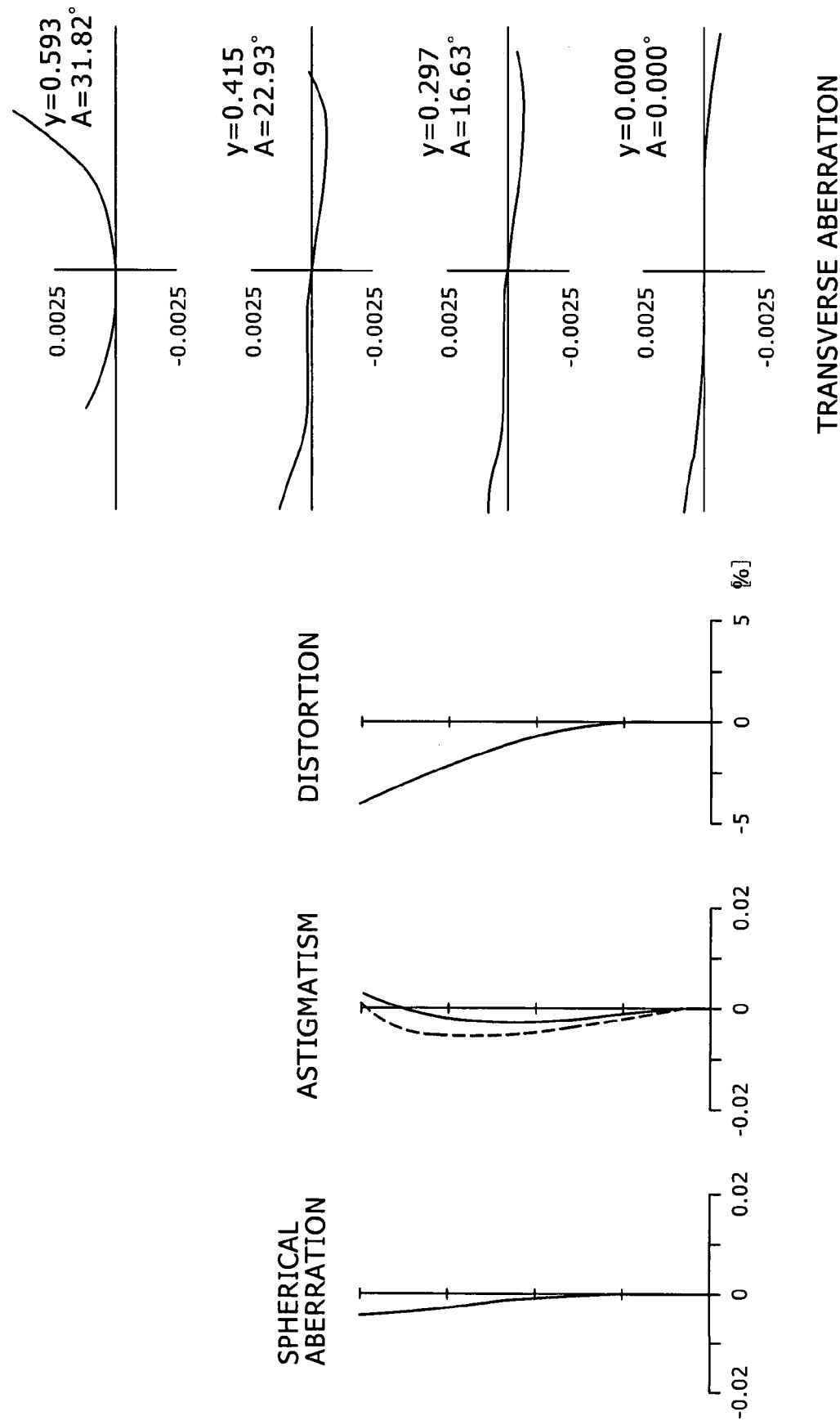
FIGS. 17 to 19 respectively illustrate graphs of various aberrations with respect to a numerical embodiment 3 using actual numerical values to the third embodiment, where graphs in FIG. 17 show spherical aberration, astigmatism, distortion and transverse aberration at a maximum wide angle state.
Figure 18:
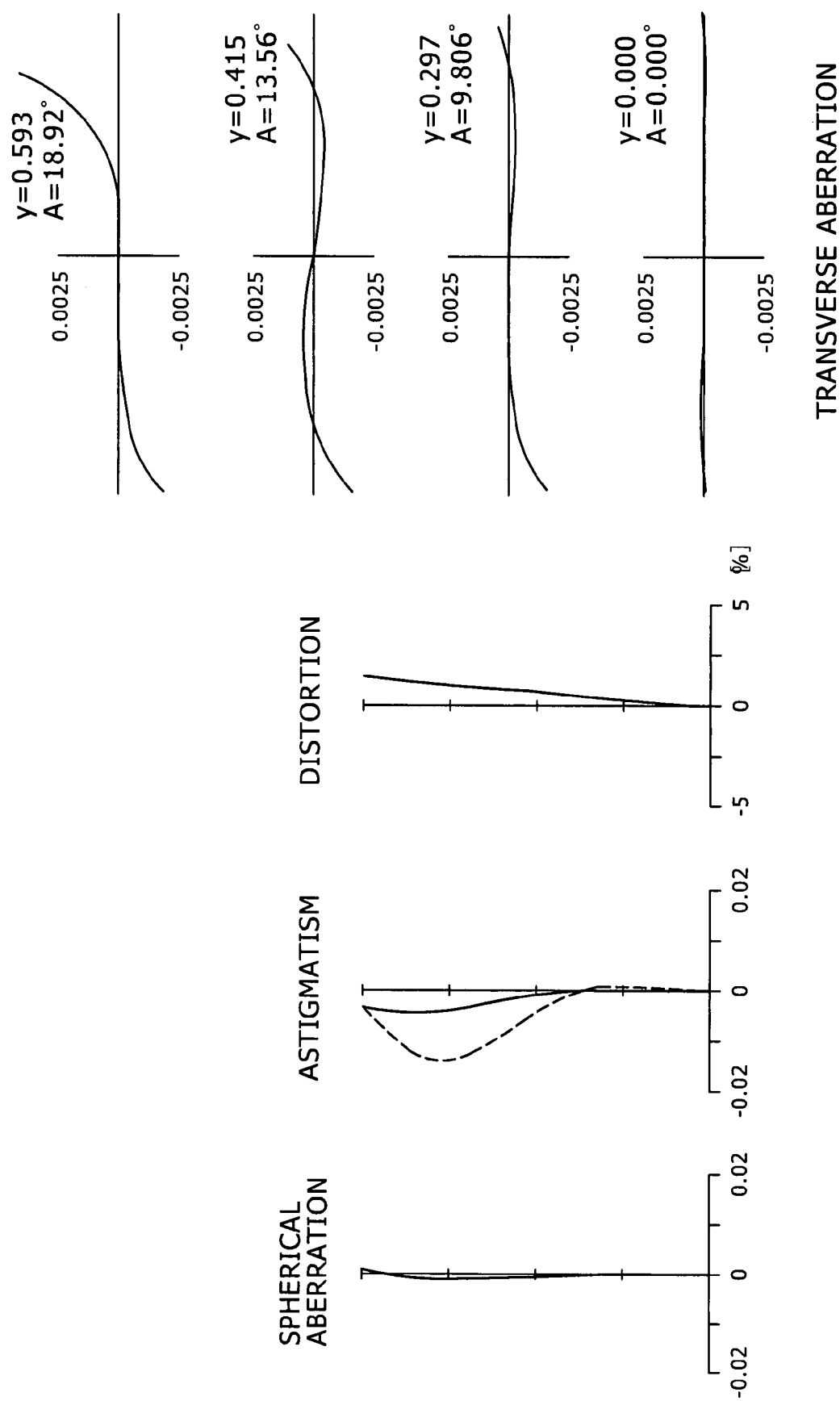
Figure 19:
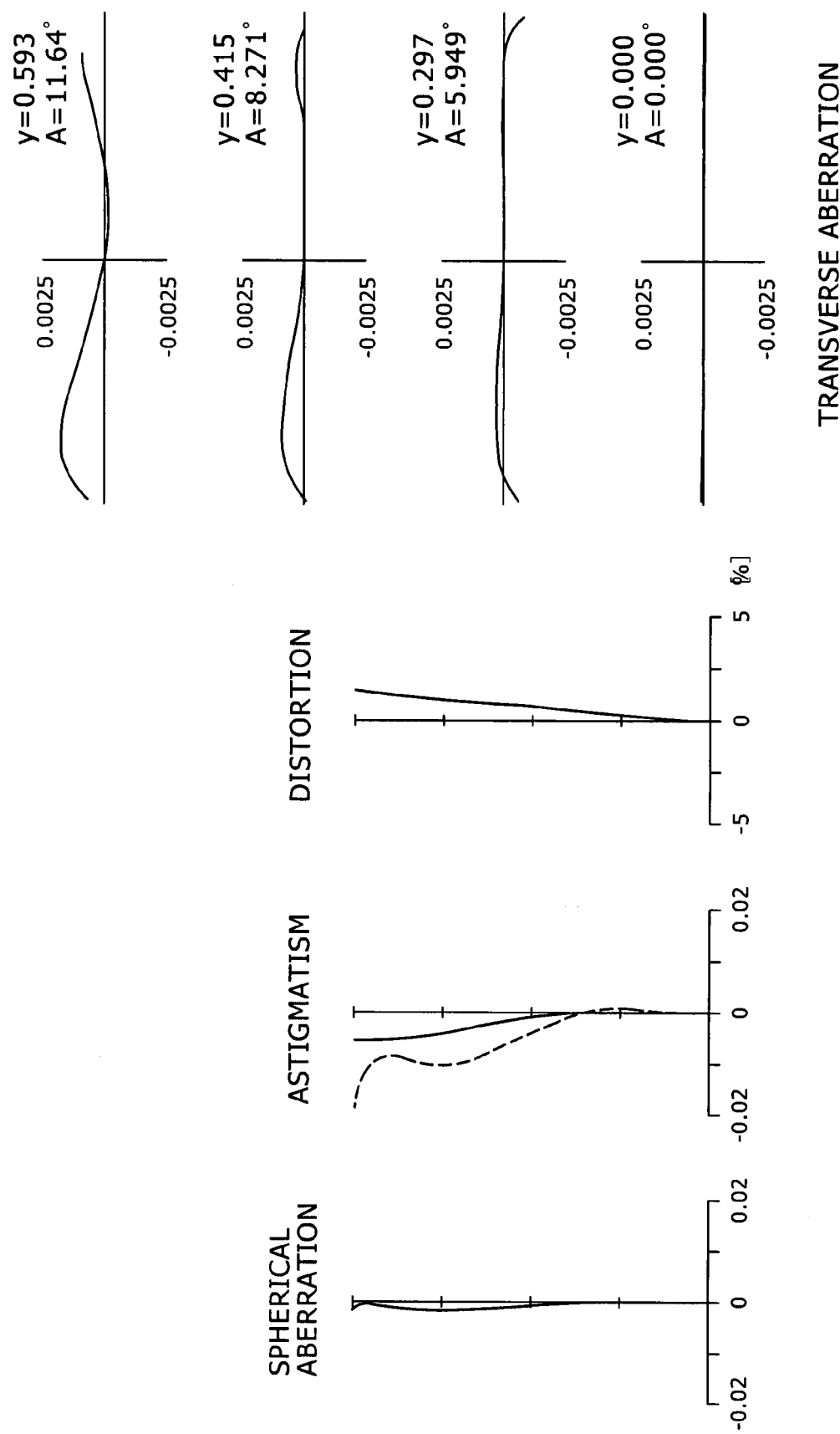

FIGS. 17 to 19 respectively illustrate graphs of various aberrations in an in-focus condition at infinity with respect to the numerical embodiment 3, where graphs in FIG. 17 show various aberrations in the maximum wide angle state (f=1.000), those in FIG. 18 show various aberrations in the mid-focal length position (f=1.702), and those in FIG. 19 show various aberrations in the maximum telephoto state (f=2.820).

Referring to each aberration graph in FIGS. 17 to 19, the solid line in each spherical aberration graph indicates aspherical aberration, while the solid line and the broken line in each astigmatism graph indicate a sagittal image plane and a meridional image plane, respectively. In the transverse aberration graphs, A indicates an angle of view, and y indicates an image height.

Figure 20:
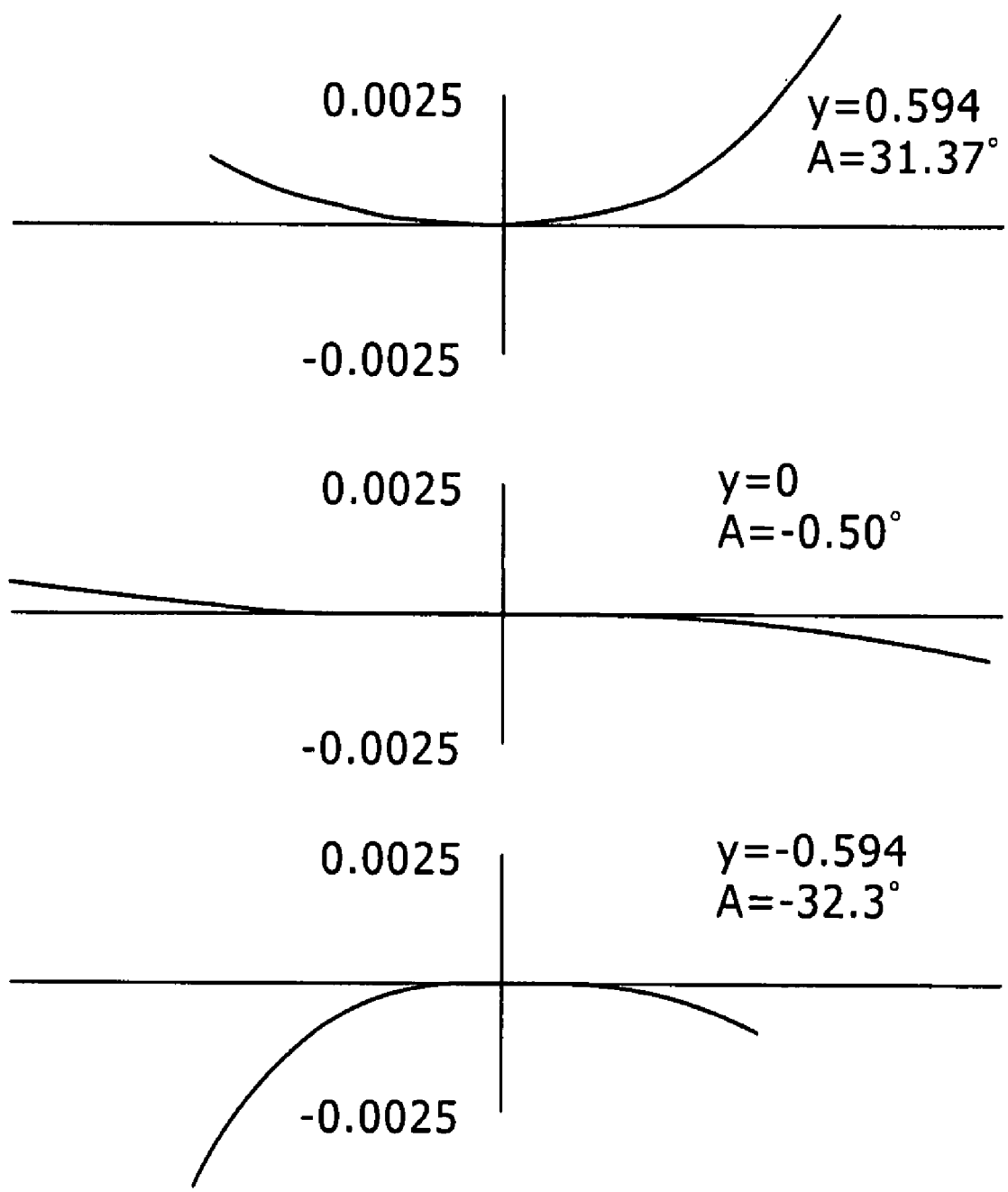
FIGS. 20 to 22 respectively illustrate graphs of transverse aberration in a condition equivalent to around 0.5-degree lens shift with respect to the numerical embodiment 3 using actual numerical values to the third embodiment, where graphs in FIG. 20 show transverse aberration at a maximum wide angle state.
Figure 21:
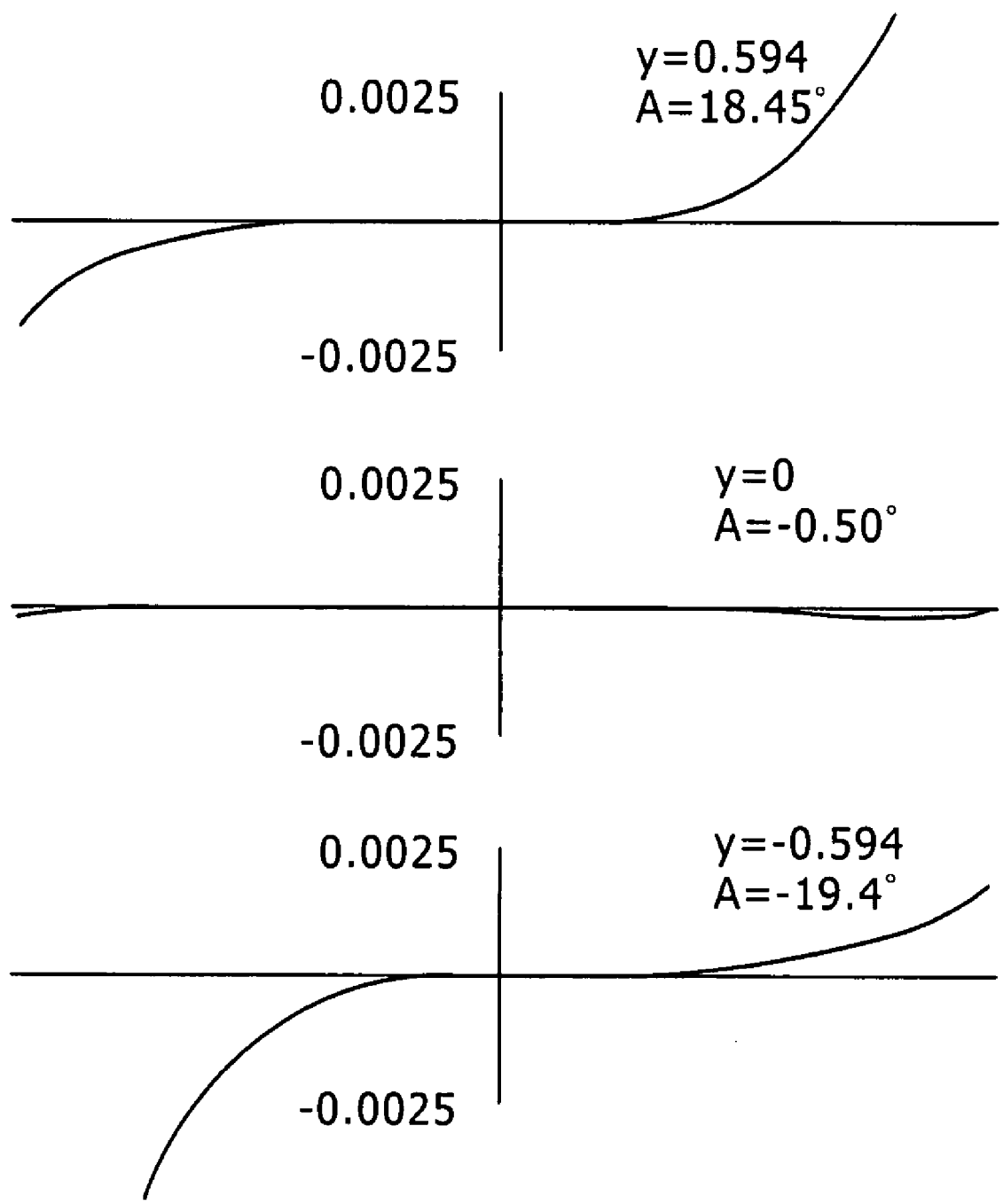
Figure 22:
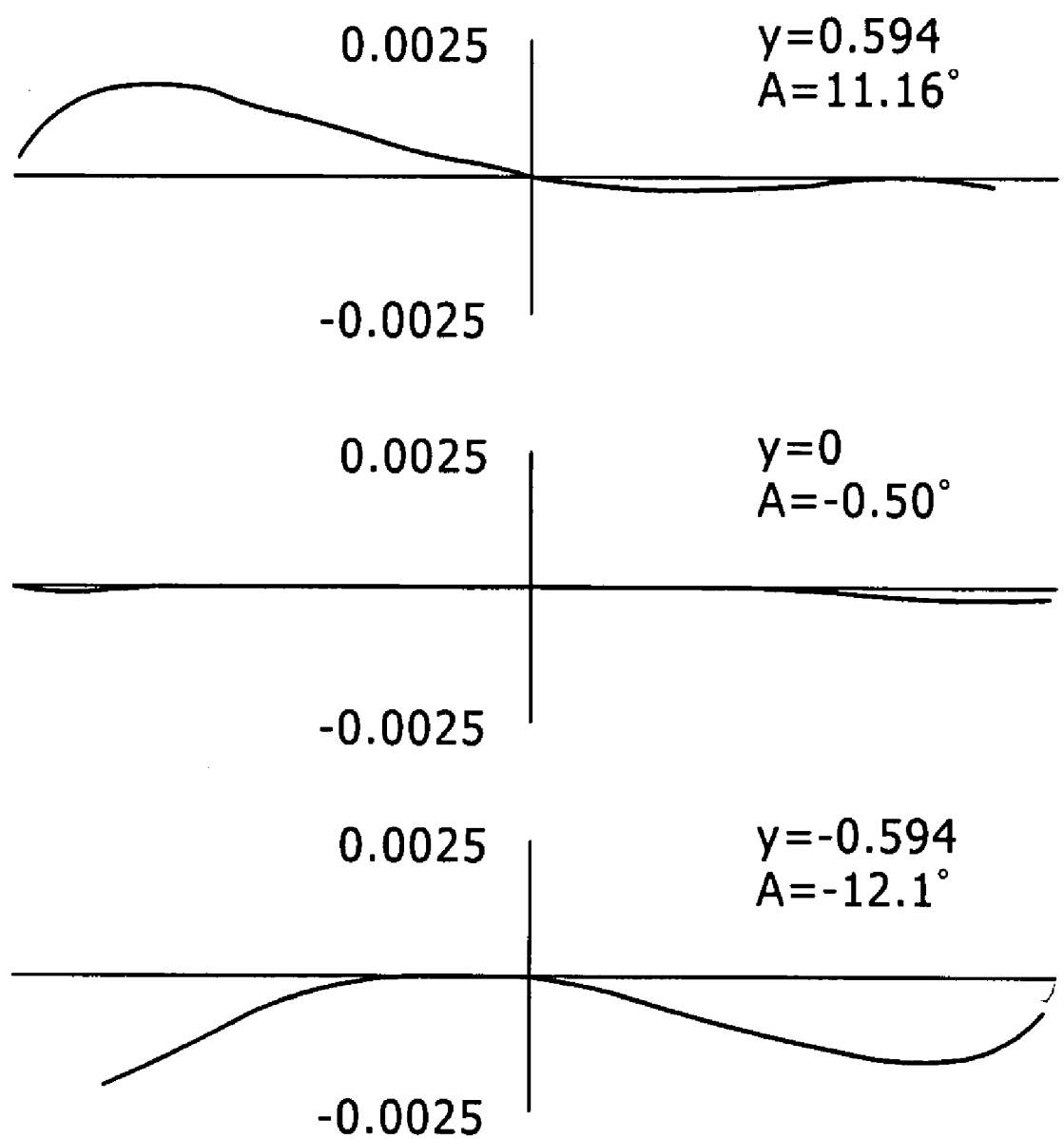

FIGS. 20 to 22 respectively illustrate graphs of transverse aberration in a condition equivalent to around 0.5-degree lens shift with respect to the numerical embodiment 3 in the in-focus condition at infinity, where graphs in FIG. 20 show transverse aberration in the maximum wide angle state (f=1.000), those in FIG. 21 show transverse aberration in the mid-focal length position (f=1.702), and those in FIG. 22 show transverse aberration in the maximum telephoto state (f=2.820).

It is obviously seen from each aberration graph that in the numerical embodiment 3 sufficient correction of various aberrations and excellent imaging performance are achieved.

An imaging apparatus according to an embodiment of the present invention is now described.

The imaging apparatus according to an embodiment of the present invention includes a zoom lens and an imaging device for converting an optical image formed by the zoom lens into electric signals. The zoom lens includes, in order from the object side, a first lens group having a negative refractive power, a second lens group having a positive refractive power and a third lens group having a positive refractive power. When a lens positional state changes from a maximum wide angle state to a maximum telephoto state, the second lens group moves on an optical axis toward an object side, and at the same time, the first and the third lens groups also move in an optical axis direction in such a manner that a gap between the first lens group and the second lens group decreases, while gap between the second lens group and the third lens group increases. When a change in subject position occurs, close-range focusing is performed by movement of the third lens group, and image shift is provided by shifting the second lens group in directions approximately perpendicular to the optical axis. Further, conditional equations (1) and (2) shown below are satisfied.

$$0.8 < TLw/TLt < 0.95 \quad (1)$$

$$0.6 < |f1|/ft < 0.8 \quad (2)$$

where TLw is a total lens length in the maximum wide angle state, TLt is a total lens length in the maximum telephoto state, f1 is a focal length of the first lens group, and ft is a focal length of an overall lens system in the maximum telephoto state.

Figure 24:
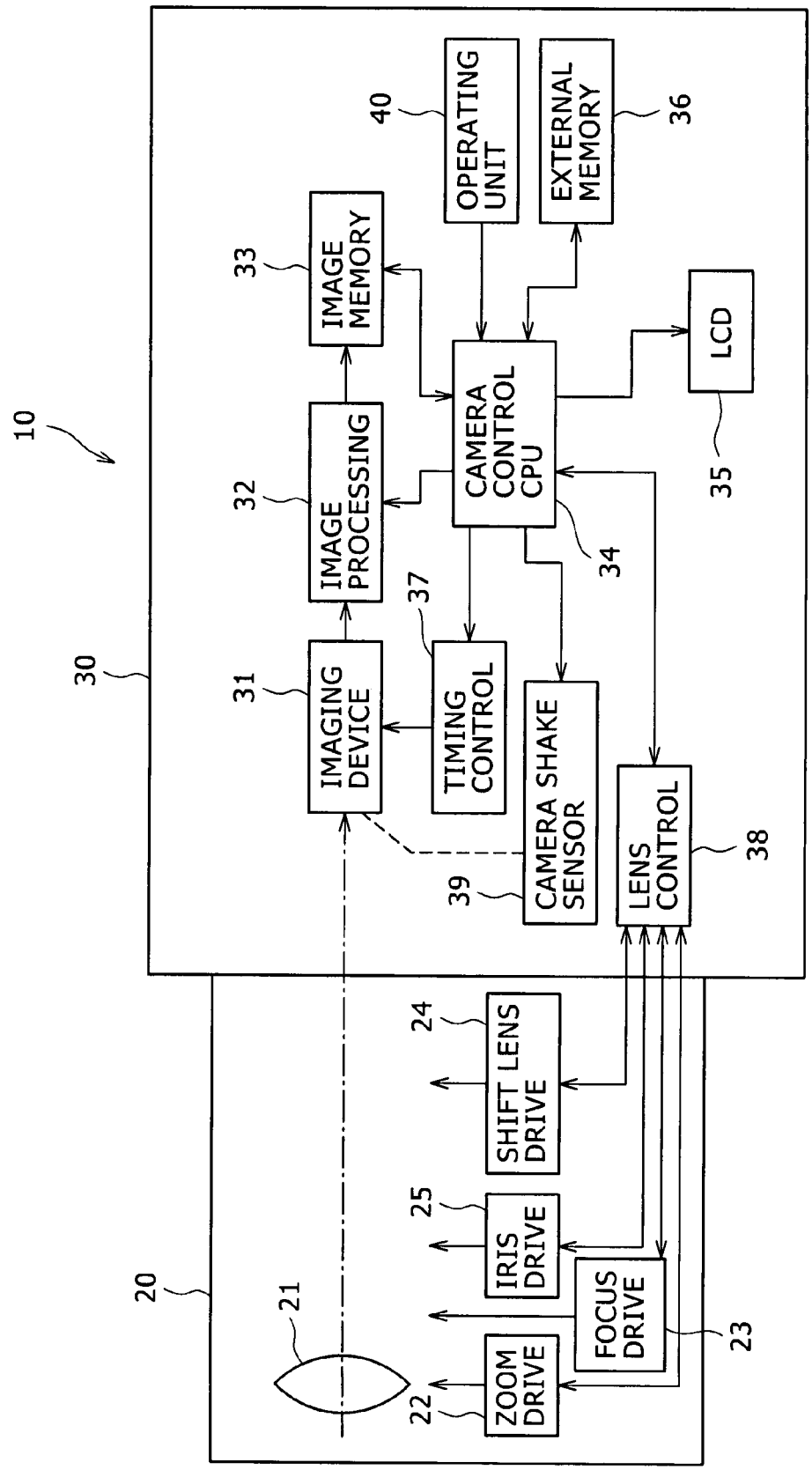
FIG. 24 is a block diagram showing one embodiment of an imaging apparatus according to the present invention.

FIG. 24 is a block diagram showing a digital still camera according to one embodiment of the imaging apparatus of the present invention.

A digital still camera 10 has a lens unit 20 for optically acquiring a subject image, and a camera body unit 30 providing functions of converting the optical subject image acquired by the lens unit 20 into electric image signals, and giving various processing to the image signals, while controlling the lens unit.

The lens unit 20 includes a zoom lens 21 having optical elements such as lenses and filters, a zoom drive unit 22 for moving a zooming lens group during zooming, a focus drive unit 23 for moving a focusing lens group, a shift lens drive unit 24 for shifting a shift lens group in the directions perpendicular to the optical axis, and an iris drive unit 25 for controlling a degree of opening of the aperture stop. Zoom lenses applicable to the zoom lens 21 may include any of the zoom lenses 1 to 3 or those according to their numerical embodiments or those according to embodiments of the present invention other than the embodiments and the numerical embodiments.

The camera body unit 30 has an imaging device 31 for converting the optical image formed by the zoom lens 21 into the electric signals.

Charge Coupled Devices (CCD) and Complementary Metal-Oxide Semiconductors (CMOS) may be applicable to the imaging device 31. Various processing are performed on the electric image signals outputted from the imaging device 31 at an image processing circuit 32 and then data is compressed in a predetermined manner, and stored temporarily stored in an image memory 33 as image data.

A camera control Central Processing Unit (CPU) 34 is to generally control the entirety of the camera body unit 30 as well as of the lens unit 20, and performs fetching of temporarily stored image data from the image memory 33 for display on a liquid crystal display unit 35 and/or for storage in an external memory 36. In addition, it reads out the image data stored in the external memory 36 for display on the liquid crystal display unit 35.

Signals from an operating unit 40 including switches such as a shutter release switch and a zooming switch are entered into the camera control CPU 34 to control unit in response to the signals from the operating unit 40. When the shutter release switch is operated, for instance, a command is outputted from the camera control CPU 34 to a timing control unit 37, causing the rays from the zoom lens 21 are entered into the imaging device 31, and the signal readout timing with respect to the imaging device 31 is controlled by the timing control unit 37.

Signals relating to control of the zoom lens 21, such as Auto Focus (AF) signals, Auto Exposure (AE) signals and zooming signals are sent from the camera control CPU 34 to a lens control unit 38, and the zoom control unit 22, the focus drive unit 23 and the iris drive unit 25 are controlled by the lens control unit 38 such that the zoom lens 21 becomes a predetermined condition.

In addition, the imaging apparatus also has a camera shake sensor 39 for detecting a camera shake or oscillations of the imaging device 31, for instance. When the camera shake sensor 39 detects the camera shake, a camera shake detection signal is entered into the camera control CPU 34, a correction signal is generated by the camera control CPU 34. Then, the correction signal generated is sent to the shift lens drive unit 24 included in the camera unit 20 through the lens control unit 38, and moves the shift lens (the second lens group G2) such that the image shift caused by the camera shake with respect to the imaging device 31 by the lens shift drive unit 24 is cancelled.

It is noted that while the embodiments give the imaging apparatus in the form of the digital still camera, but an embodiment of the present invention is not limited to the digital still camera, and it is also allowable to apply the imaging apparatus in the form of a digital video camera. Further, applications to camera units such as those integrated in information apparatuses such as personal computers and Personal Digital Assistants (PDA) are also possible.

It is also noted that all the various component configurations and numerical values previously described in each of the embodiments are interpreted as only illustrative for embodying the present invention and not in a sense of limiting the technical scope of the present invention.

According to an embodiment of the present invention, it is possible to shift the image, and also to attain the reductions in diameter and thickness of the lens system.

It should be understood by those skilled in the art that various modifications, combinations, sub-combinations and alterations may occur depending on design requirements and other factors insofar as they are within the scope of the appended claims or the equivalents thereof.

The present document contains subject matter related to Japanese Patent Application No. 2006-351560 filed in the Japanese Patent Office on Dec. 27, 2006, the entire content of which being incorporated herein by reference.

What is claimed is:

1. A zoom lens comprising, in order from an object side;
   a first lens group having a negative refractive power;
   a second lens group having a positive refractive power; and
   a third lens group having a positive refractive power;
   wherein when a lens position state changes from a maximum wide-angle state to a maximum telephoto state, the second lens group moves in an optical axis toward the object side, and the first and the third lens groups move in an optical axis direction such that a gap between the first lens group and the second lens group decreases, while a gap between the second lens group and the third lens group is increased;
   when a change in subject position occurs, close-range focusing is performed by movement of the third lens group;
   image shift is provided by shifting the second lens group in directions substantially perpendicular to the optical axis; and conditional equations (1) and (2) shown below are satisfied $$0.8 < TLw/TLt < 0.95 \quad (1)$$

$$0.6 < |f1|/ft < 0.8 \quad (2)$$

where TLw is a total lens length in the maximum wide-angle state, TLt is a total lens length in the maximum telephoto state, fl is a focal length of the first lens group, and ft is a focal length of an overall lens system in the maximum telephoto end state.

2. The zoom lens according to claim 1, wherein:
an aperture stop is placed adjacent to the object side of the second lens group, and
the second lens group includes a positive lens and a cemented negative lens, the cemented negative lens being arranged on the image side of the positive lens and formed of a convexo-convex positive lens and a concavo-concave negative lens, and
a conditional equation (3) shown below is satisfied $$0.5 < RN2/Ds < 0.85 \quad (3)$$

where RN2 is a radius of curvature of an image-side lens surface of the cemented negative lens, and Ds is a distance from the aperture stop to the image-side lens surface of the cemented negative lens.

3. The zoom lens according to claim 2, wherein:
at least one of the object-side lens surface and the image-side lens surface of the positive lens of the second lens group is of aspherical shape, and
a conditional equation (4) shown below is satisfied $$1 < fw/faw < 1.5 \quad (4)$$

where faw is a composite focal length of the first lens group and the positive lens in the maximum wide-angle state, and fw is a focal length of an overall lens system in the maximum telephoto state.

4. The zoom lens according to claim 3, wherein:
a conditional equation (6) is satisfied $$1.8 < f3/fw < 3 \quad (6)$$

where f3 is a focal length of the third lens group.

5. The zoom lens according to claim 3, wherein:
the first lens group includes a negative lens and a meniscus positive lens, the negative lens having an aspheric concave surface facing toward the image side, the meniscus positive lens being arranged on the image side of the negative lens with an air gap in between, having a positive refractive power, and having a convex surface facing toward the object side, and
a conditional equation (7) shown below is satisfied $$0.18 < D12/fw < 0.3 \quad (7)$$

where D12 is an optical axial length of an air gap formed between the negative lens and the positive lens arranged in the first lens group.

6. The zoom lens according to claim 1, wherein:
a conditional equation (5) shown below is satisfied $$Ymax./Da < 0.26 \quad (5)$$

where Ymax. is a maximum image height, and Da is a distance between an aperture stop and an image plane in the maximum wide-angle state.

7. The image capture apparatus according to claim 1, wherein:
the first lens group includes a negative lens and a meniscus positive lens, the negative lens having an aspheric concave surface facing toward the image side, the meniscus positive lens being arranged on the image side of the negative lens with an air gap in between, having a positive refractive power, and having a convex surface facing toward the object side.

8. An image capture apparatus comprising:
a zoom lens; and
an imaging device for converting an optical image formed by the zoom lens into an electric signal;
wherein the zoom lens includes, in order from the object side, a first lens group having a negative refractive power, a second lens group having a positive refractive power, and a third lens group having a positive refractive power;
when a lens positional state changes from a maximum wide angle state to a maximum telephoto state, the second lens group moves on an optical axis toward the object side, and at the same time, the first and the third lens groups also move in an optical axis direction such that a gap between ten first lens group and the second lens group decreases, while gap between the second lens group and the third lens group is increases;
when a change in subject position occurs, close-range focusing is performed by movement of the third lens group, and image shift is provided by shifting the second lens group in directions approximately perpendicular to the optical axis; and
conditional equations (1) and (2) shown below are satisfied $$0.8 < TLw/TLt < 0.95 \quad (1)$$

$$0.6 < |f1|/ft < 0.8 \quad (2)$$

where TLw is a total lens length in a maximum wide angle state, TLt is a total lens length in a maximum telephoto state, fl is a focal length of the first lens group, and ft is a focal length of an overall lens system in the maximum telephoto state.

9. The image capture apparatus according to claim 8, wherein:
the first lens group includes a negative lens and a meniscus positive lens, the negative lens having an aspheric concave surface facing toward the image side, the meniscus positive lens being arranged on the image side of the negative lens with an air gap in between, having a positive refractive power, and having a convex surface facing toward the object side.

* * * * *